(12) United States Patent
Xia et al.

(10) Patent No.: US 11,757,481 B1
(45) Date of Patent: Sep. 12, 2023

(54) DETECTING CO-CHANNEL INTERFERENCE USING CYCLIC AUTOCORRELATION TEST

(71) Applicant: Amazon Technologies, Inc., Seattle, WA (US)

(72) Inventors: Pengfei Xia, San Diego, CA (US); Timothy Leo Gallagher, Woodinville, WA (US); Danijela Cabric, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/544,655

(22) Filed: Dec. 7, 2021

(51) Int. Cl.
*H04B 1/10* (2006.01)
*H04B 7/185* (2006.01)

(52) U.S. Cl.
CPC ....... *H04B 1/1027* (2013.01); *H04B 7/18513* (2013.01)

(58) Field of Classification Search
CPC .................................................. H04B 1/1027
USPC ...................................................... 375/346
See application file for complete search history.

(56) References Cited

U.S. PATENT DOCUMENTS

| | | | | |
|---|---|---|---|---|
| 6,922,450 | B2 * | 7/2005 | Yuda ...................... | G01S 3/043 375/346 |
| 2010/0054352 | A1 * | 3/2010 | Huttunen ............ | H04L 27/0006 375/340 |
| 2011/0085612 | A1 * | 4/2011 | Muraoka ............. | H04L 27/0006 455/142 |
| 2015/0042515 | A1 * | 2/2015 | Kawahata ............ | H01Q 1/1257 342/427 |
| 2017/0311291 | A1 * | 10/2017 | Dai ...................... | H04W 72/085 |
| 2020/0136744 | A1 * | 4/2020 | Shah ................... | H04L 27/0006 |

* cited by examiner

*Primary Examiner* — Lihong Yu
(74) *Attorney, Agent, or Firm* — Lowenstein Sandler LLP

(57) ABSTRACT

Technologies directed to co-channel interference detection using a signal correlation test are described. One method includes receiving a radio frequency (RF) signal and generating digital sample corresponding to the RF signal. The method further includes determining a first correlation coefficient using the digital samples, a first value, and a second value. The first value corresponds to a signal lag parameter and the second value corresponds to a cyclic frequency parameter. The method further includes determining a second correlation coefficient using the digital samples, the first value, and a third value corresponding to the cyclic frequency parameter. The second value and the third value are multiples of a fourth value. The method further includes determining, using the first correlation coefficient and the second correlation coefficient, that first RF signal comprises a first portion from a second communication device and a second portion from a third communication device.

18 Claims, 14 Drawing Sheets

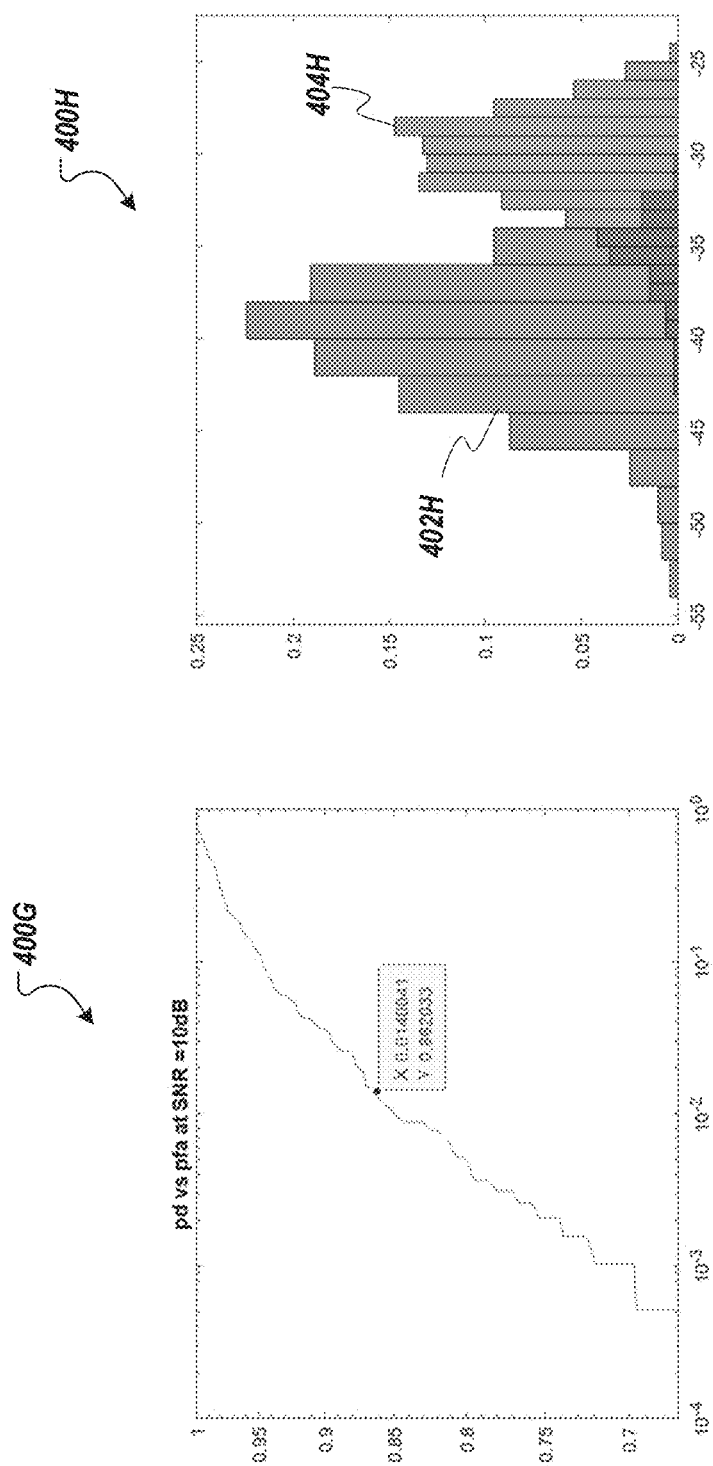

US 11,757,481 B1

DETECTING CO-CHANNEL INTERFERENCE USING CYCLIC AUTOCORRELATION TEST

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 4A-J illustrate graphs corresponding to the rate and/or accuracy of interference detection, according to embodiments of the present disclosure.

DETAILED DESCRIPTION

Figure 1:
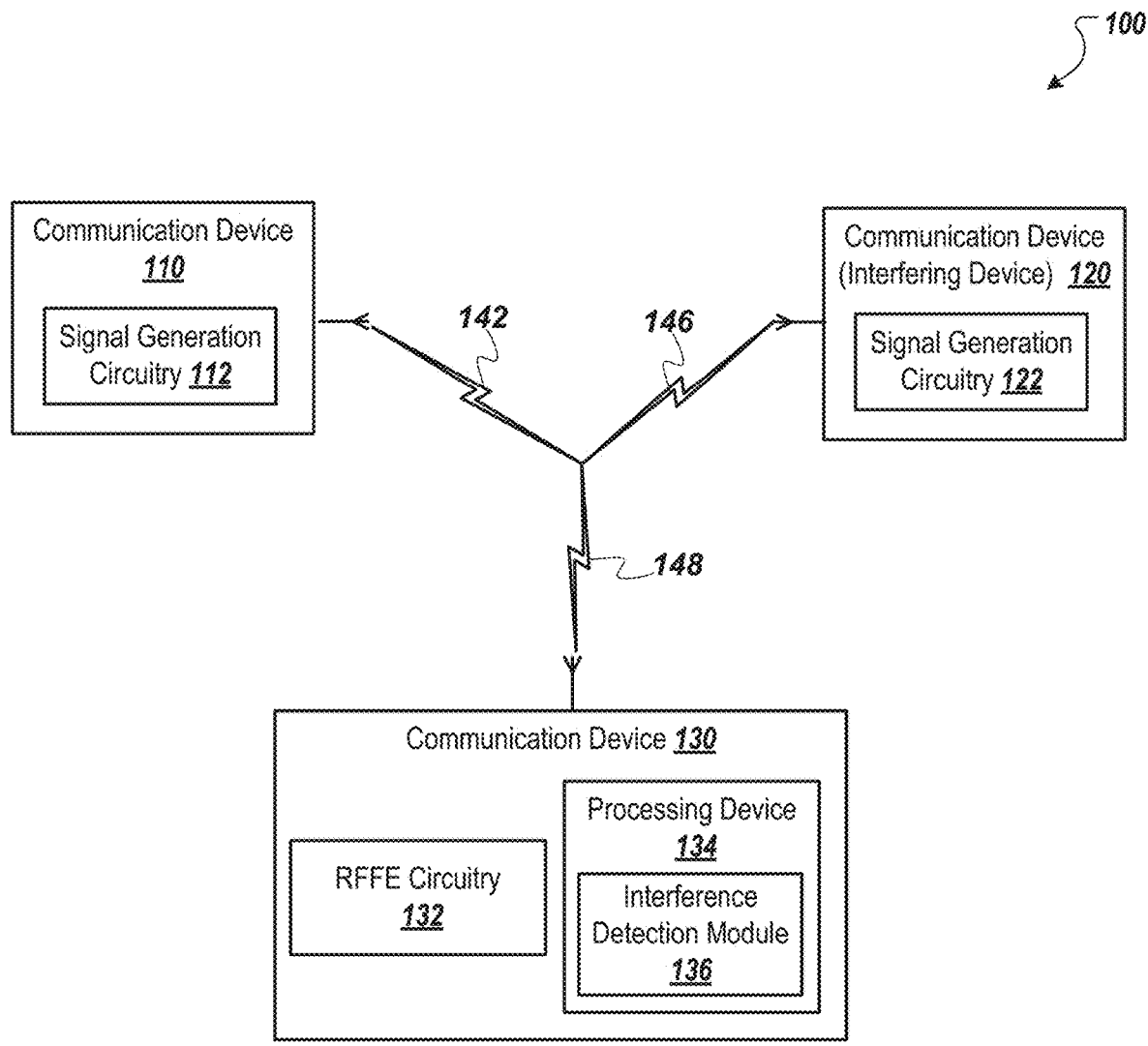
FIG. 1 is a block diagram of a communication system including a communication device with an interference detection module, according to embodiments of the present disclosure.

Technologies directed to detecting co-channel interference using a cyclic autocorrelation test are described. In wireless communications, a wireless receiver tries to decide if a certain type of interference is present. If the interference is not present, the communication may continue as usual. Otherwise, the wireless receiver may take remedial action in view of the interference. To detect the interference, a certain detection time will be needed. In addition, the decision itself may have a certain probability of detection and probability of false alarm. It is desired to have an interference detector with a short detection time, a large probability of detection, and a small probability of false alarm.

Wireless signal interference can come from many sources, including other wireless transmitters in the area or other devices that emit signals sharing similar attributes to a signal a receiver expects to receive. Interference can reduce the quality of a wireless link and, depending on the type and severity of the interference, may make reliably receiving information difficult.

Conventional signal interference detection often involves sweeping a signal spectrum (e.g., using a spectrum analyzer) to determine anomalies in a signal. Capturing an interference signal with a swept-tuned spectrum analyzer requires that signal be present (i.e., in an "on" state) when the analyzer performs its measurement at the frequency of the interfering signal. But since a swept-tuned spectrum analyzer sweeps across a range of frequencies, the possibility exists that the interference signal is not present (i.e., in an "off" state) when the analyzer performs its measurement at the interfering signal's frequency. Sweeping multiple frequencies can also be resource dependent, especially in situations where a potentially interfering signal may exist with a narrow band of frequencies.

Other Conventional interference detection methods, such as energy-based detection, can be inconsistent in accurately reporting the presence of interference (e.g., prone to raise false alarms when the signal is not present). Signal interference detection using other methods like pilot insertion or preambles can require coarse synchronization of the signal in frequency and time, which can be difficult, especially as signal-to-noise ratio (SNR) parameters get smaller and smaller.

Aspects of the present disclosure overcome deficiencies of conventional interference by providing methods, systems, and/or devices for consistent co-channel interference detection using a cyclic autocorrelation test. The present disclosure includes a method that uses a multi-branch cyclic auto-correlation test to determine a total or overall correlation metric by adding metrics (e.g., correlation coefficients) from individual branches. The total metric is leveraged to determine the presence or absence of a potentially interfering signal (e.g., with known parameters such as signal lag and cyclic frequency). In some embodiments, the detection time can be reduced given a target detection probability and target likelihood of a false alarm.

In an exemplary embodiment, a method includes receiving a first RF signal and generating digital samples corresponding to the first RF signal. The method further includes determining a first correlation coefficient using a first copy of the digital samples with a first cyclic autocorrelation (CAC) function, including a first value and a second value. The first value indicates a signal delay of the first CAC function, and the second value corresponds to a cyclic frequency of the first CAC function. The method further determines a second correlation coefficient using a second copy of the digital samples with a second CAC function comprising the first value and a third value. The third value corresponds to a cyclic frequency of the second CAC function, and the third value includes an integer multiple of the second value. The method further includes determining a total correlation coefficient by combining the first correlation coefficient and the second correlation coefficient. The method further includes determining that the RF signal includes a signal interference corresponding to a second RF signal having a signal delay corresponding to the first value and a second cyclic frequency corresponding to the second value. The method further includes removing at least a portion of the signal interference from the digital samples. In further embodiments, more correlation coefficients may be determined (e.g., three correlation coefficients, four correlation coefficients, five correlation coefficients, and so on) and leveraged to determine the presence of signal interference.

FIG. 1 is a block diagram of a communication system 100, including a communication device 130 with an interference detection module 136, according to embodiments of the present disclosure. Communication system 100 includes a first communication device 110 that transmits signal 142, s[n] (e.g., RF signal) to a third communication device 130. The third communication device 130 receives signal 148, r[n], a portion of which includes signal 142, but may also include signal noise, w[n] (e.g., wideband receiver noise), inherent from any of the communication devices 110, 120, 130 and/or signal interference, i[n], from another communication device 120 attempting to communicate (e.g., signal 146). For example, the received signal 148 may be represented as:

$$r[n]=s[n]+i[n]+w[n] \qquad \text{Equation 1}$$

where r[n] represented the received signal 148 received by communication device 130, s[n] represents a transmitted signal 142 sent by communication device 110, i[n] represents an interfering signal 146 associated with communication device 120, and w[n] represents wideband receiver noise.

Communication devices 110 and 120 may include circuitry capable of producing an RF signal (e.g., signal generation circuitry 112 and 122), and communication device 130 may include circuitry capable of receiving and processing an RF signal (e.g., RFFE circuitry 132). In one embodiment, communication devices 110, 120, and 130 utilize the Wi-Fi® or IEEE 802.11 standard protocol. In other embodiments, the wireless connections may use some other wireless protocol, such as the current 3rd Generation Partnership Project (3GPP) long term evolution (LTE), or time division duplex (TDD)-Advanced systems. Communication devices 110, 120, and 130 may each include one or more antennas, receivers, transmitters, or transceivers that are configured to utilize a wireless local area network (WLAN) protocol, such as the Wi-Fi® or IEEE 802.11 standard protocol, other radio protocols, such as 3GPP LTE, or TDD-Advanced, or any combination of these or other communications standards. In one embodiment, the wireless communications between communication devices 110, 120, and 130 may utilize the same Wi-Fi® or IEEE 802.11 standard protocol or other protocols such as Bluetooth®, ZigBee, near field communications (NFC), or other protocols capable of communicating digitally encoded signal (e.g., cyclostationary digitally encoded RF signals).

Communication devices 110, 120, and 130 may comprise one or more directional or omnidirectional antennas, including, for example, dipole antennas, monopole antennas, patch antennas, loop antennas, microstrip antennas, or other types of antennas suitable for transmission of radio frequency (RF) signals. In some embodiments, instead of two or more antennas, a single antenna with multiple apertures may be used. In these embodiments, each aperture may be considered a separate antenna. In some embodiments, communication devices 110, 120, and 130 may utilize multiple-input multiple-output (MIMO) circuits and/or methodology. For example, antennas may be effectively separated to utilize spatial diversity and the different channel characteristics that may result between each of the antennas and the antennas of a transmitting station. In some MIMO embodiments, antennas may be separated by up to $1/10$ of a wavelength or more.

In some embodiments, communication device 120 generates digitally encoded RF signals using one or more digital modulation schemes. In embodiments, communication device 120 leverages orthogonal frequency-division multiplexing (OFDM) to generate interfering signal 146. OFDM is a digital multi-carrier modulation scheme that extends the concept of single subcarrier modulation by using multiple subcarriers within the same single channel. Rather than transmit a high-rate stream of data with a single subcarrier, OFDM makes use of a large number of closely-spaced orthogonal subcarriers that are transmitted in parallel. Each subcarrier is modulated with a conventional digital modulation scheme (such as quadrature phase shift keying (QPSK), 16QAM, etc.) at a symbol rate, $T_s$. However, the combination of many subcarriers enables data rates similar to conventional single-carrier modulation schemes within equivalent bandwidths.

In some embodiments, communication device 120 leverages quadrature amplitude modulation (QAM) to generate interfering signal 146. QAM includes a signal in which two carriers are shifted in phase by 90 degrees (e.g., sine and cosine) are modulated and combined. As a result of the phase difference, the phase shifted carriers are in quadrature one with the other. Each of the signals includes a symbol rate, $T_s$, associated with a rate (e.g., frequency), the digital symbols occur within the QAM signal.

As previously indicated, communication device 130 receives signal 148, r[n], as expressed above. The RFFE circuitry 132 (e.g., antennas, automatic gain controller (AGC), analog-to-digital converter (ADC), as will be discussed further in later embodiments) processes the process signal 148 (e.g., converts the signal to a digital representation) to produce digital samples of the received signal 148. As shown in FIG. 1, communication device 130 includes one or more processing devices 134, such as one or more CPUs, microcontrollers, field programmable gate arrays, or other types of processors. Processing device 134 processing the digital samples using interference detection module 136 to determine whether signal interference corresponding to communication device 120 is interfering with the received signal.

Interference detection module 136 receives digital samples representing the received RF signal 148. As will be discussed in greater detail in other embodiments, the interference detection module 136 leverages one or more signal correlation procedures (e.g., cyclic autocorrelation (CAC) function) to identify one or more correlation metrics that, when combined, can reliably indicate whether the received RF signal comprises signal interference (e.g., from a known device such as communication device 120).

The interference detection module 136 looks for one of the following scenarios:

$$r[n] = \begin{cases} s[n] + w[n] & H_0 \\ s[n] + i[n] + w[n] & H_1 \end{cases} \qquad \text{Equation 2}$$

Under the first scenario ($H_0$), the received signal, r[n] does not include signal interference, i[n]. Under the second scenario ($H_1$), the received signal, r[n] includes signal interference, i[n]. The interference detection module 136 includes a target metric, γ, (e.g., target correlation coefficient) that if met indicates that an interfering signal is present and if the target metric is not satisfied, the communication system 100 determines the absence of the interfering signal, i[n]. The target metric, γ, is associated with a total correlation calculated by the interference detection module 136. Parameters of the interference signal, i[n], affect the target metric, γ. For example, the interference detection module 136 may alter or otherwise update the target metric based on the cyclic frequency of the interference signal, i[n]. In a further example, as previously indicated the interference signal, i[n], may be generated using ODFM or QAM and the symbol modulation rate, $T_s$, may be representative of the cyclic frequency of the interference signal, i[n]. As will be discussed further in other embodiments, the processing parameters employed by the interference detection module 136 may be updated and/or otherwise adjusted to represent run time constraints such as a minimum accuracy detection rate and/or a threshold interference detection duration (e.g., a maximum time for the module to take before making a detection determination).

As previously indicated, the interference detection module 136 leverages correlation procedures with the received signal, r[n], to identify one or more correlation metrics (e.g., correlation coefficients). In some embodiments, the interference detection module 136 uses the received signal, r[n], with a cyclic autocorrelation (CAC) function to determine when signal interference, i[n], is present in the received signal 148. A CAC function may be expressed as:

$$\tilde{R}_{r^*}^\alpha(\tau) = \frac{1}{N}\sum_{n=0}^{N-1} r[n]r^*[n-\tau]e^{-j2\pi\alpha nT_s} \qquad \text{Equation 3}$$

where r[n] is the aforementioned received signal, $T_s$, corresponds to a sampling period as discussed herein, N is a quantity of samples used to estimate the CAC, τ is lag that determines the periodicity of the autocorrelation, α is cyclic frequency, related to the periodicity of the autocorrelation, and $\tilde{R}_{r^*}^\alpha(\tau)$ is a resulting correlation distribution with individual instances of the distribution indicating correlation coefficients associated with the input signal (receive signal, r[n]).

In some embodiments, when α=0, τ=0, energy estimates (e.g., autocorrelation estimates) over samples can be represented as:

$$E_N = \tilde{R}_{r^*}^0(0) = \frac{1}{N}\sum_{n=0}^{N-1} |r[n]|^2 \qquad \text{Equation 4}$$

In some embodiments, when α=0, τ≠0, autocorrelation estimates over N samples can be represented as:

$$\tilde{R}_{r^*}^0(\tau) = \frac{1}{N}\sum_{n=0}^{N-1} r[n]r^*[n-\tau] \qquad \text{Equation 5}$$

where for OFDM signals $\tilde{R}_{r^*}^\alpha(\tau)$ has a peak at $$\alpha = \frac{K}{T_{sym}} \text{ for } \tau = T_{data}$$

where $T_{data}$ is symbol duration without Cyclic Prefix, and $T_{sym}$ is the OFDM symbol duration.

In some embodiments, when α≠0, τ=0, QAM signals have a peak at $$\alpha = \frac{K}{T_{sym}}$$

and can be represented as:

$$\tilde{R}_{r^*}^\alpha(0) = \frac{1}{N}\sum_{n=0}^{N-1} |r[n]|^2 e^{-j2\pi\alpha nT_s} \qquad \text{Equation 6}$$

where $T_{sym}$ is the QAM symbol duration. Further processing using the one or more CAC functions will be described in more detail in relation to FIGS. 2 and 3.

Although communication system 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

Figure 2:
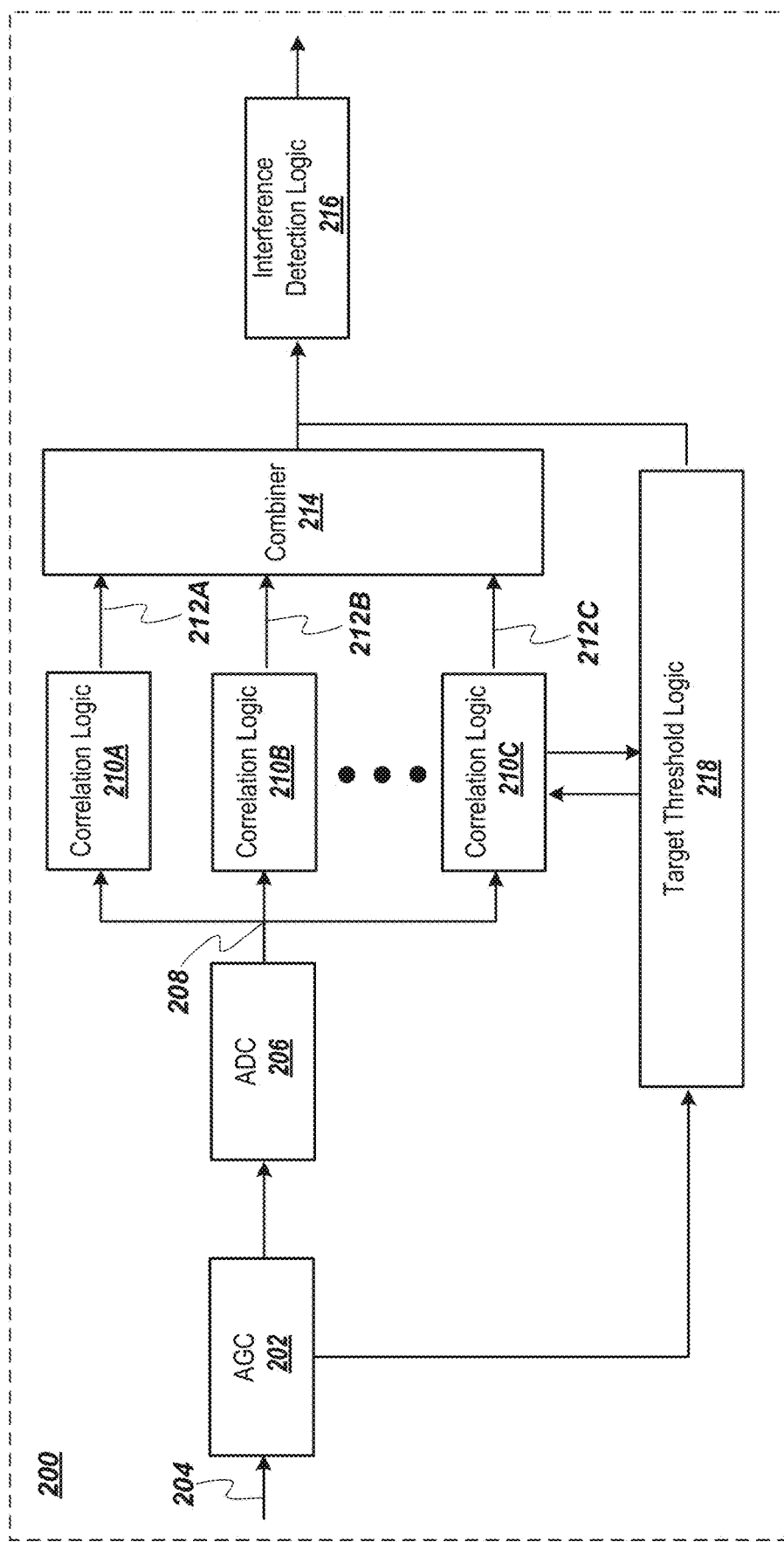
FIG. 2 is a block diagram of a communication device having correlation logic and interference detection logic, according to embodiments of the present disclosure.

FIG. 2 is a block diagram of a communication device 200 (e.g., communication device 130 of FIG. 1) having correlation logic 210A-C and interference detection logic 216, according to embodiments of the present disclosure. The received signal, r[n], may be received along logic path 204 by an automated gain controller (ADG) 202. The ADG 202 forms a closed-loop feedback regulating loop within an amplifier or chain amplifier that maintains a suitable signal amplitude at its output. The communication device 200 further includes an ADC that converts the RF signal through digital sampling of the received signal to generate digital samples corresponding to the received signal, r[n].

At junction 208, copies of the digital samples are supplied to one or more instances of correlation logic 210A-C. Each instance of correlation logic 210A-C includes processing logic for performing a correlation procedure in association with a copy of the digital samples. Each of the correlation logic 210A-C performs the correlation procedure with different correlation parameters. Each instance of the correlation logic 210A-C uses a common signal lag parameter, τ, and a related but different cyclic frequencies parameter, α. For example, first correlation logic 210A may perform a correlation procedure on a first copy of the digital samples using a first signal lag parameter, $\tau_1$, and a first cyclic frequency parameter, $\alpha_1$. Second correlation logic 210B may use a second signal lag parameter that is equal to the first signal lag parameter, $\tau_2=\tau_1$, and a second cyclic frequency parameter that is an integer multiple of the first correlation logic, $\alpha_2=n\alpha_1$ (e.g., $\alpha_2=2\alpha_1$). Third correlation logic 210C may use a third signal lag parameter that is equal to the first signal lag parameter, $\tau_3=\tau_1$, and a third cyclic frequency parameter that is an integer multiple of the first correlation logic, $\alpha_2=m\alpha_1$ (e.g., $\alpha_3=3\alpha_1$). The resulting outputs 212A-C from correlation logic 210A-C is results from the previously described correlation procedures. The outputs may include correlation metrics (e.g., correlation coefficients) associated with the corresponding signal lag and cyclic frequency parameter values.

As shown in FIG. 2, communication device 200 includes a combiner 214. Combiner 214 combines the outputs from each of the correlation logic 210A-C into an aggregate result (e.g., a total metric or total correlation coefficient).

In some embodiments, as discussed previously, correlation logic may include performing a cyclic autocorrelation (CAC) function using copies of the digital samples. For example, first correlation logic 210A may perform the CAC function according to the following representation:

$$\tilde{R}^{\alpha}_{r^*}(\tau) = \frac{1}{N}\sum_{n=0}^{N-1} r[n]r^*[n-\tau]e^{-j2\pi\alpha nT_s} \qquad \text{Equation 7}$$

The second correlation logic 210B may perform an analogous process using a different cyclic frequency, as described, and can be represented as the following:

$$\tilde{R}^{2\alpha}_{r^*}(\tau) = \frac{1}{N}\sum_{n=0}^{N-1} r[n]r^*[n-\tau]e^{-j2\pi(2\alpha)nT_s} \qquad \text{Equation 8}$$

The third correlation logic 210C and any successive correlation logic may be carried out and represented in like fashion. The results of each of the correlation logic 210A-C may be aggregated together. The communication device may determine an overall metric (e.g., sum all of CAC function peaks at a given lag, τ and cyclic frequency, α). For example, the following represents aggregate metrics (e.g., aggregate or total correlation coefficients) for first-order, second-order, and third-order examples.

$$T_1(\alpha) = |R^{\alpha}_{r^*}(\tau)| = \frac{1}{N}\left|\sum_{n=0}^{N-1} r[n]r^*[n-\tau]e^{-j2\pi\alpha nT_s}\right| \quad \text{Equation 9, 10, and 11}$$

$$T_2(\alpha, 2\alpha) = |R^{\alpha}_{r^*}(\tau)| + |R^{2\alpha}_{r^*}(\tau)|$$

$$T_3(\alpha, 2\alpha, 3\alpha) = |R^{\alpha}_{r^*}(\tau)| + |R^{2\alpha}_{r^*}(\tau)| + |R^{3\alpha}_{r^*}(\tau)|$$

where $T_n$ represents an aggregate correlation metric for n number of cyclic peaks leveraged in generating the aggregate correlation metric. The number of cyclic peaks, n, can be selectively modified based on a rate of interference detection, one or more parameters of the incoming signal to be processed specifically symbol modulation rate, signal-to-noise (SNR) values, and/or signal-to-interference ratio (SIR) values.

As shown in FIG. 2, the communication device 200 includes interference detection logic 216. The interference detection logic 216 evaluates whether the aggregate correlation metric output from combiner 214 meets a threshold condition. This logical process may be represented as:

$$\Sigma |R^{m\alpha}(\tau)|_<^> \gamma \qquad \text{Equation 12}$$

where γ represents the target or threshold value used in determining whether communication device 200 determines that the signal interference is present or absent within the received signal at logic path 204. The signal interference corresponds to a portion of the received RF signal (e.g., a selection or portion of the RF signal, a second RF signal). The interfering signal has signal parameters associated with the signal lag parameter, τ, and the cyclic frequency parameter, α. For example, the interfering signal includes a digitally encoded RF signal with digital symbol duration corresponding to the lag parameter, τ, and symbol modulation rate (e.g., encoding periodicity) corresponding to the cyclic frequency parameter, α.

In some embodiments, the interference detection logic 216 detects the signal interference and takes action to account for the detected signal interference. For example, the interference detection logic may cause the communication device to remove at least a portion of the interfering signal from the digital samples. For example, the communication device 200 may subtract the interference signal from the total received signal.

In some embodiments, the communication device 200 may cause a notification or to be displayed (e.g., on a graphical user interface (GUI)) or flagged within a data storage associated. The notification indicates a presence or an absence of the interfering signal. In some embodiments, the communication device may send a signal to another device to operate in a different wireless channel (e.g., to avoid the detected signal interference).

As shown in FIG. 2, the communication device 200 includes target threshold logic 218. As indicated previously, interference detection logic 216 employs a target threshold, γ, in determining the presence or absence of a signal interference within the received RF signal. Target threshold logic 218 determines parameters associated with carrying out the signal interference detection. Target threshold logic 218 determines how many cyclic peaks (e.g., $T_1$, $T_2$, $T_3$, ... $T_n$) to be used in determining an aggregate correlation metric (e.g., total correlation coefficient) and comparing with the target threshold, γ.

In some embodiments, target threshold logic 218 receives data indicating one or more parameters of the input signal and one or more parameters associated with the signal interference. The one or more parameters of both the input signal and the potential signal interference may indicate an SNR and/or SIR value associated with the input RF signal and the potentially interfering signal. The number of cyclic peaks, n, can be selectively modified based on a rate of interference detection, one or more parameters of the incoming signal to be processed specifically symbol modulation rate, signal-to-noise (SNR) values, and/or signal-to-interference ratio (SIR) values. The target threshold logic 218 determines one or more of the target threshold, γ, and the number of cyclic peaks to be used by correlation logic 210A-C to determine one or more correlation metrics.

In some embodiments, the target threshold logic 218 weighs both accuracy and detection time in determining target threshold, γ, and the number of cyclic peaks to be used. The target threshold logic 218 may determine a predicted accuracy rate and/or detection time based on one or more parameters of the input signal (e.g., SNR, SIR, etc.). For example, the target threshold logic 218 may determine that detecting signal interference using two cyclic peaks is below a threshold value and may cause the correlation logic to use a third cyclic peak. In another example, the target threshold logic 218 may determine that a detection rate is below a threshold target detection rate (e.g., a rate of accurately detecting an interfering signal, i[n], when the interfering signal, i[n], is a component of the received signal, r[n], and/or rate of accurately determining the absence of the interfering signal, i[n], when the interfering signal, i[n], is not a component of the received signal, r[n]) and cause the correlation logic to use one or more additional cyclic peaks when determining whether the signal interference is present. In some embodiments, the target threshold, $\gamma$, may be determined using statistical analysis such as using the Neyman-Pearson lemma.

Figure 3:
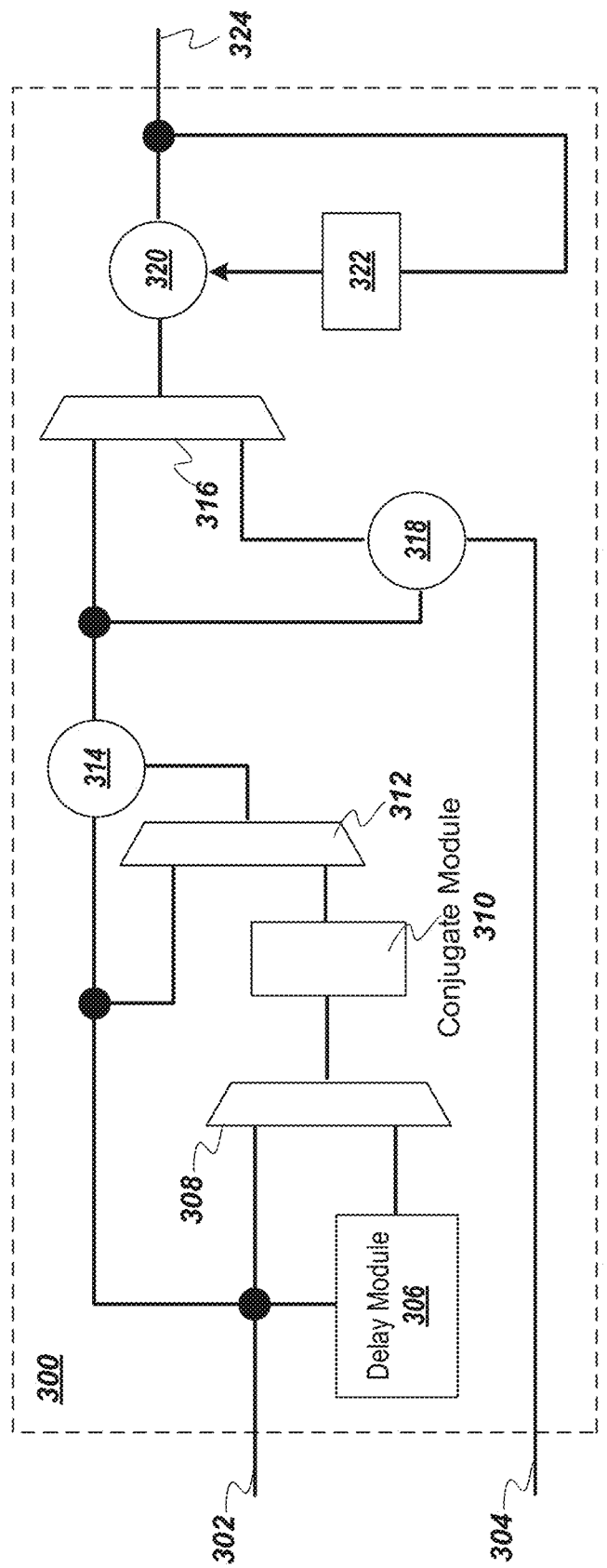
FIG. 3 is a block diagram of a processing block associated with a signal correlation procedure, according to embodiments of the present disclosure.

FIG. 3 is a block diagram of a processing block 300 associated with a signal correlation procedure, according to embodiments of the present disclosure. At path 302, the digital samples (e.g., r[n]) are received by processing block 300. The digital samples are provided to multiplexer 308 and delay module 306. At delay module 306, the digital samples are delayed by a delay parameter, $\tau$ (e.g., delay parameter as described in FIG. 2). Digital samples, output from multiplexer 308, are provided to conjugate module 310. The multiplexer 308 may select (e.g., using an external control signal) one of two received inputs as output from multiplexer 308. At conjugate module 310, processing logic determines a conjugate (e.g., r[n−$\tau$]*) to the digital samples. The output from block 310 and a copy of the digital samples are provided to multiplexer 312. Output from multiplexer 312 and a copy of the digital samples come together at junction 314. At junction 314, the digital samples are multiplied by the delayed conjugate digital sample to generate autocorrelated digital samples (e.g., r[n]r[n−$\tau$]*) or other representations of the digital signals such as a power density (e.g., $r^2$ or $|r|^2$) for other signal processing applications. In some embodiments, target threshold logic (e.g., target threshold logic 218 of FIG. 2) provides one or more control signals to one or more of multiplexer 308, 312, and 316.

At path 304, the cyclical portion (e.g., cyclical frequency parameter)of the autocorrelation function (e.g., $e^{j2\pi\alpha nT_s}$) is received by the processing block 300. The cyclic portion may correspond to the received signal. For example, a cyclic component $T_s$ may correspond to a modulation rate of the digital symbol encoded in the received digital sample (e.g., r[n]). The cyclic portion also accounts for which cyclic peak (e.g., n$\alpha$) the current process block 300 is tasked to calculate. At junction 318, the cyclic component is combined with the autocorrelated digital sample to generate a cyclic autocorrelated representation of the input signal overlaid with a lagged conjugate signal (e.g., [n]r[n−$\tau$]*$e^{j2\pi\alpha nT_s}$).

The combined cyclic autocorrelated digital samples are provided to multiplexer 316. At junction 320 each of the digital samples is calculated and aggregated together. At block 322, processing logic performs functionality associated with a digital feedback filter. For example, processing logic counts and iterates through all the samples (e.g., N) for the cyclic autocorrelated digital samples. Processing block outputs the resulting correlation coefficient for the $n^{th}$ cyclic peak using the digital samples (e.g., r[n]).

FIG. 4A-J illustrate graphs 400A-J corresponding to rate and/or accuracy of interference detection associated with interference detection threshold for various signal parameters, according to embodiments of the present disclosure.

As previously indicated, the signal interference detection logic described herein may be configured to detect the presence or absence of a signal interference of a signal with known signal parameters (e.g., signal lag $\tau$ and cyclic frequency $\alpha$). As previously described, the interference detection module (e.g., interference detection module 136 of FIG. 1) encounters one of two scenarios expressed by the following:

$$r[n] = \begin{cases} s[n] + w[n] & H_0 \\ s[n] + i[n] + w[n] & H_1 \end{cases} \quad \text{Equation 13}$$

As previously described, under the first scenario ($H_0$), the received signal, r[n] does not include the signal interference, i[n]. Under the second scenario ($H_1$), the received signal, r[n] includes the signal interference, i[n]. The interference detection module 136 includes a target metric, $\gamma$, (e.g., target correlation coefficient) that if met indicates the presence of the interfering signal, i[n], and if not met indicates the absence of the interfering signal, i[r]. The target metric, $\gamma$, is associated with a total correlation calculated by the interference detection module. The target metric, $\gamma$, can be specialized (e.g., catered to) a specific received signal, specific signal interference, and a desired detection accuracy. Detection accuracy can be based on one or more of the following: a first rate at which the system accurately determines signal interference when signal interference actually exists; and a second rate at which the system accurately determines that signal interference does not exists. Threshold rates for both values can be set (e.g., accuracy goals) and used by the interference detection methodology (e.g., target threshold logic 218 of FIG. 2). The interference detection methodology may leverage data simulation to predict detection accuracy using various target thresholds, $\gamma$.

Figure 4B:
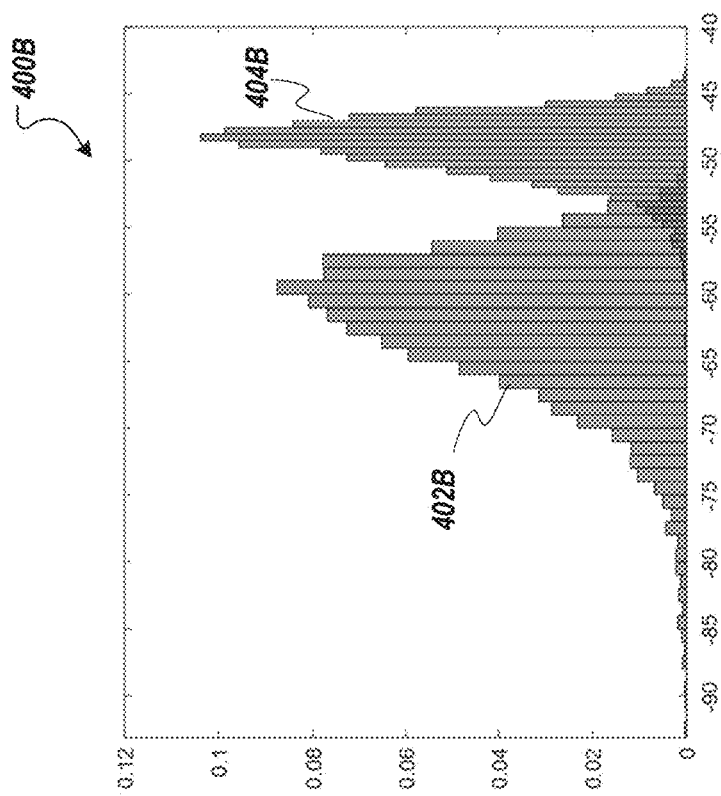
Figure 4A:
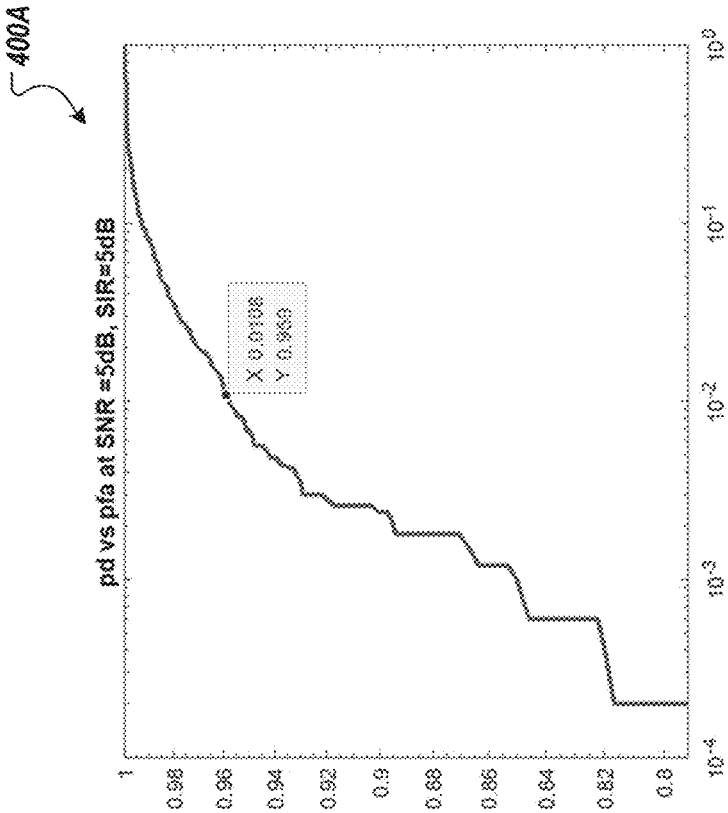

FIG. 4A indicates a graph 400A illustrating a data simulation using an input signal using 5dB SNR and 5dB SIR between the simulated received signal, simulated interference signal, and simulated noise. Graph 400A indicates accuracy pairs associated with a first value indicating a first rate associated with determining signal interference when signal interference is not present and a second value indicating a second rate associated with determining signal interference when signal interference is actually present. Graph 400A illustrates interference detection using only the first cyclic peak (e.g., $T_1$ as described herein). FIG. 4B illustrates a graph 400B illustrating analogous data to graph 400A. A first data series 402B indicates a rate of incorrectly determining the first scenario, and the second data series 404B indicates a rate of accurately determining the second scenario.

Figure 4D:
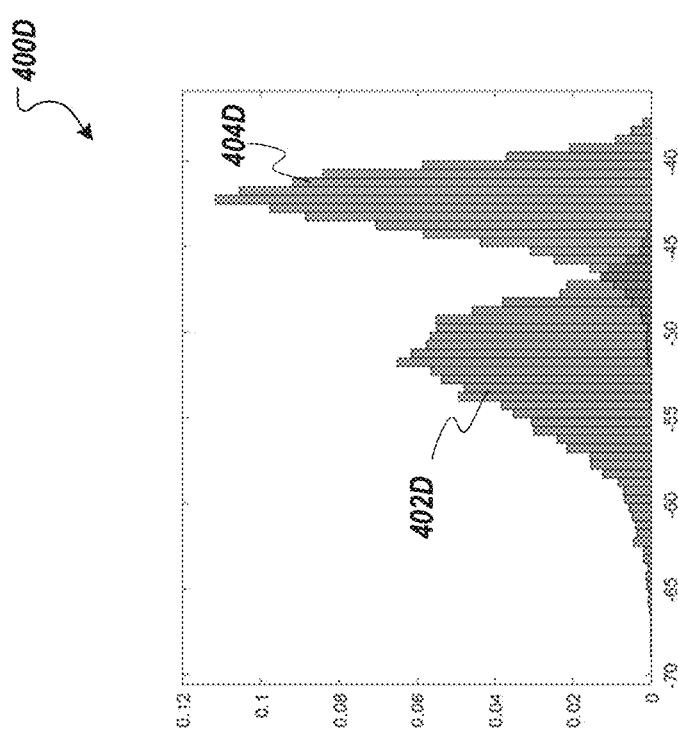
Figure 4C:
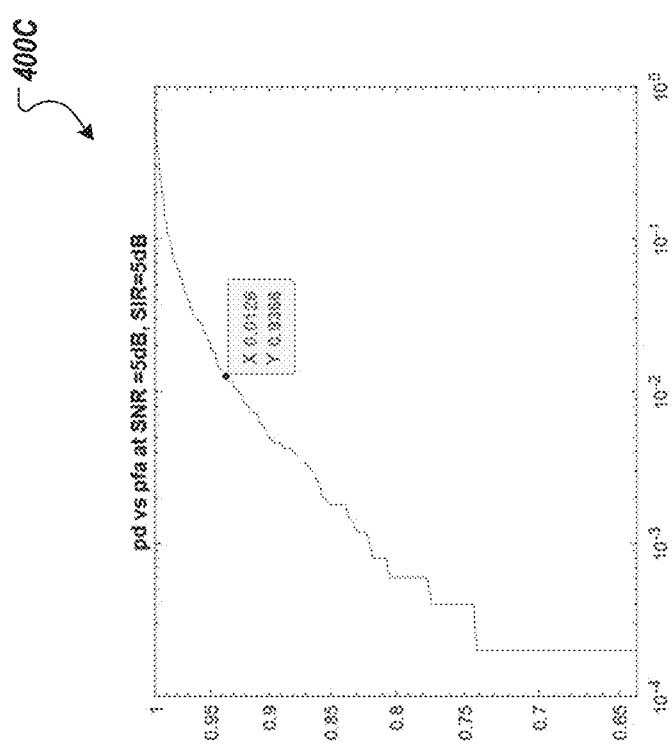
Figure 4F:
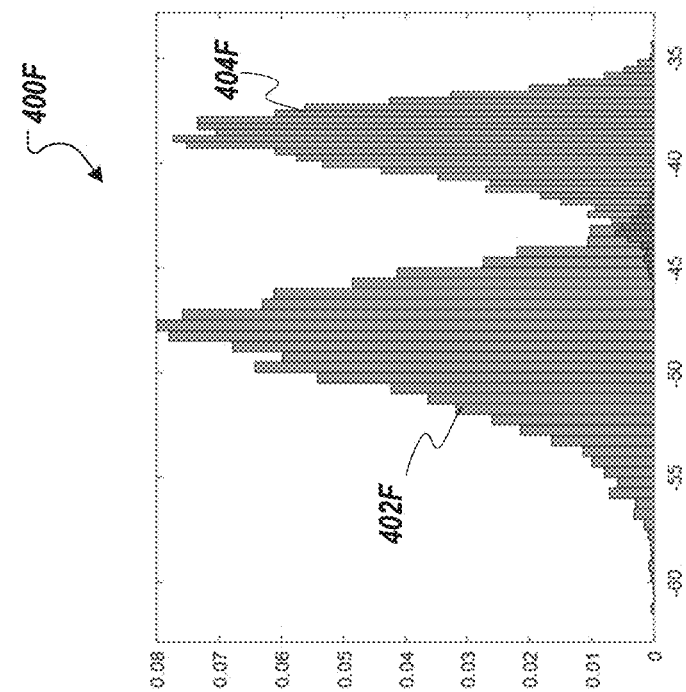
Figure 4E:
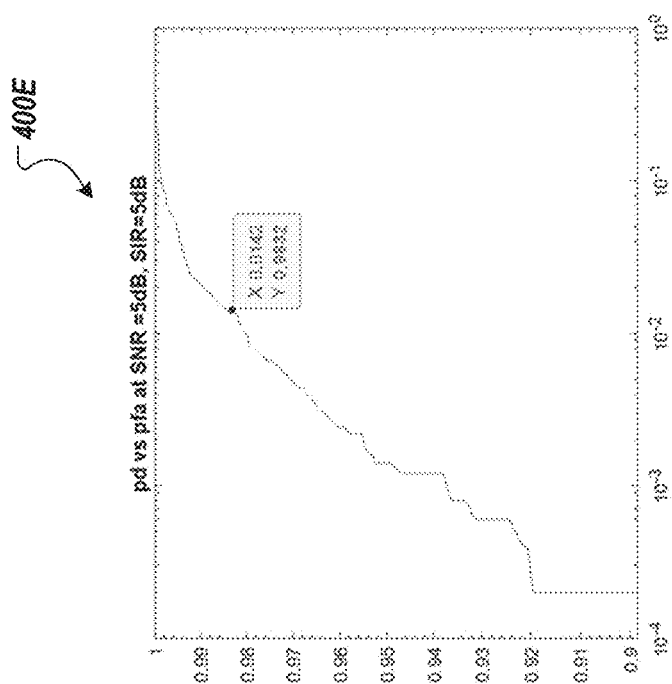
Figures 4I, 4J:
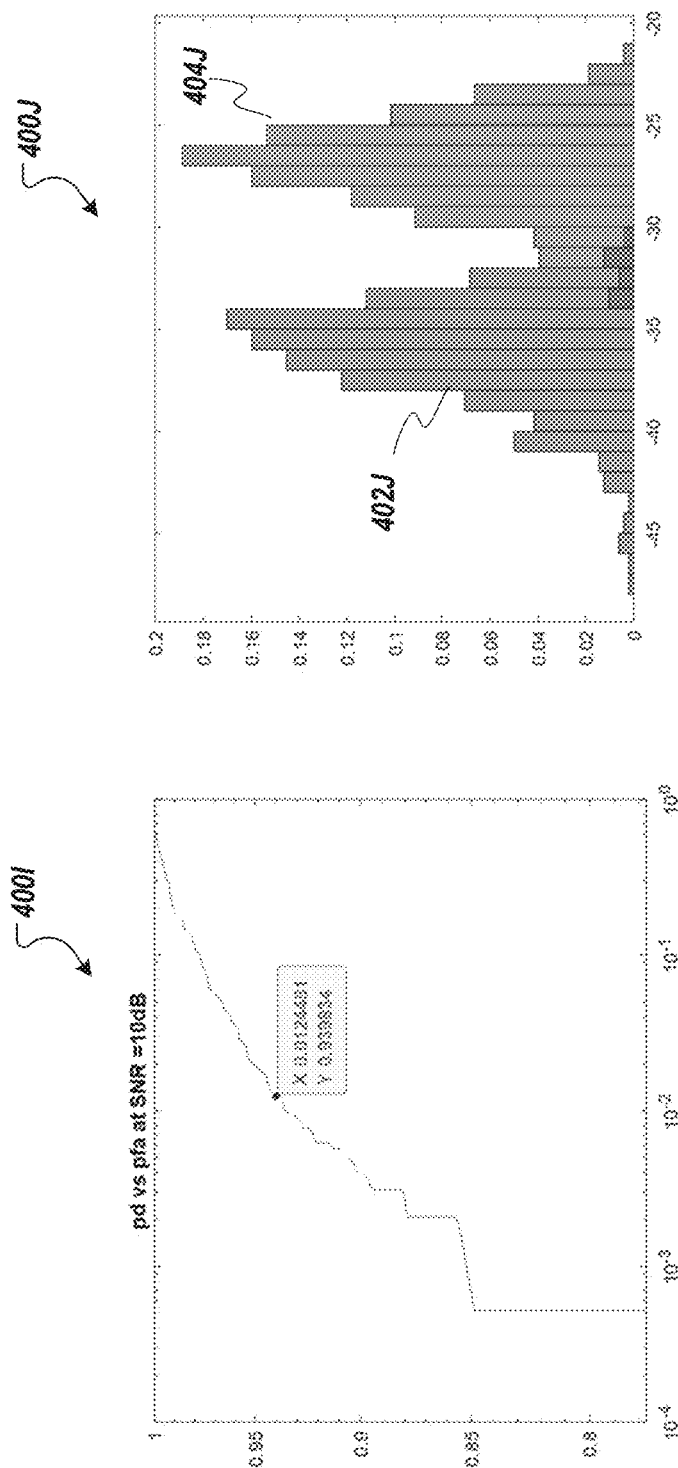

FIG. 4C includes a graph 400C uses the same SNR and SIR values as graph 400A; however, graph 400C illustrate interference detection using the first and second cyclic peaks (e.g., $T_2$ as described herein). FIG. 4D illustrates a graph 400D illustrating analogous data to graph 400C. A first data series 402D indicates a rate of incorrectly determining the first scenario, and the second data series 404D indicates a rate of accurately determining the second scenario. FIG. 4E includes a graph 400E that uses the same SNR and SIR values as graph 400A; however, graph 400E illustrate interference detection using the first, second, and third cyclic peaks (e.g., $T_3$ as described herein). FIG. 4F illustrates a graph 400F illustrating analogous data to graph 400C. A first data series 402F indicates a rate of incorrectly determining the first scenario, and the second data series 404F indicates accurately determining the second scenario. Graphs 400C and 400E show that using more cyclic peaks improves the detection rate of both the first scenario and the second scenario.

FIGS. 4G-J include graph 400G-J using a smaller SNR and a greater SIR than that of graphs 4A-F. Graph 400G-H illustrates interference detection using the first and second cyclic peaks (e.g., $T_2$ as described herein). Graph 400I-J illustrates interference detection using the first, second, and third cyclic peaks (e.g., $T_3$ as described herein) Graphs 400G-J show that using more cyclic peaks improves the detection rate of both the first scenario and the second scenario, even for different SNR and SIR parameters.

Figure 5:
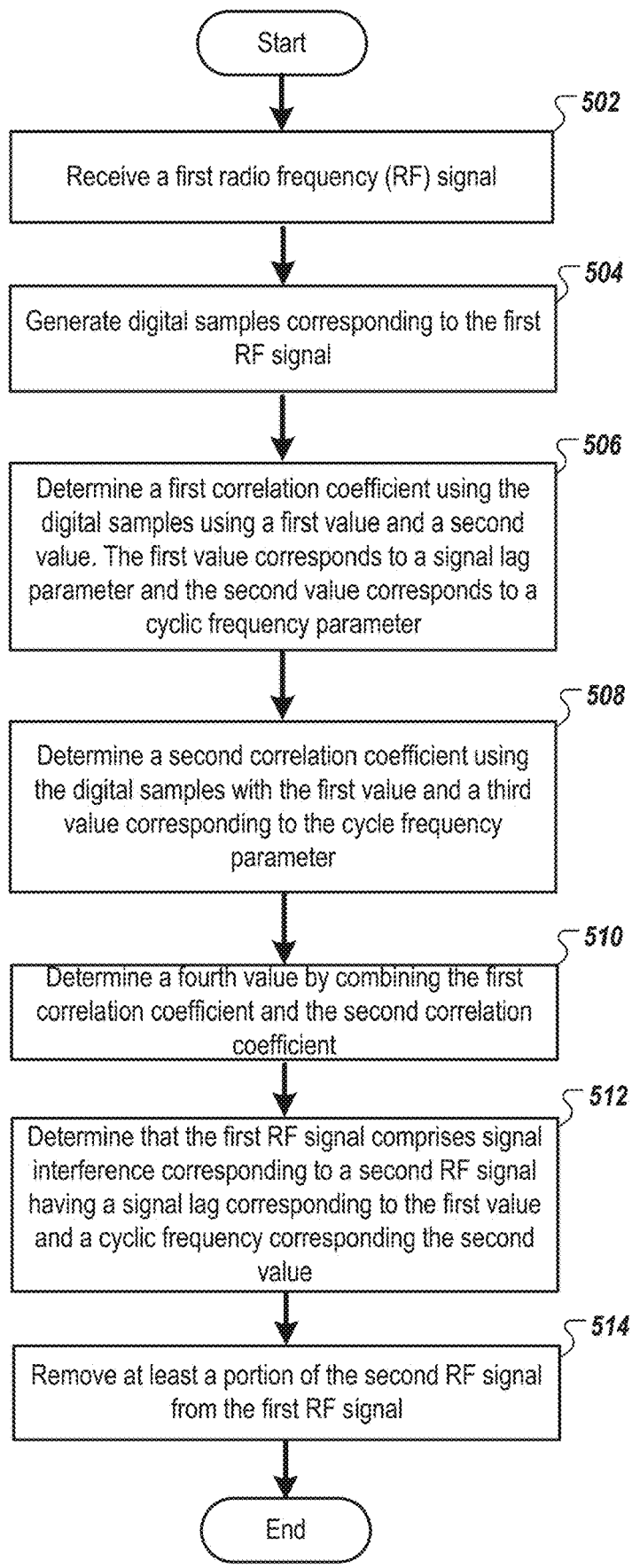
FIG. 5 is a flow diagram of a method for detecting signal interference using a correlation procedure, according to one embodiment.

FIG. 5 is a flow diagram of a method 500 for detecting signal interference using a correlation procedure, according to one embodiment. Method 500 may be performed by processing that may comprise hardware (circuitry, dedicated logic, etc.), software (such as run on a general purpose computer system or a dedicated machine) or any combination thereof. In one implementation, the method is performed on communication device 130 using processing device 134 of FIG. 1. In another implementation, method 500 may be performed using communication device 200 and/or processing block 300 of FIGS. 2 and 3, respectively, while in some other implementations, one or more blocks of FIG. 5 may be performed by one or more other machines not depicted in the figures.

Method 500 may include receiving an RF signal and determining the presence of signal interference of a signal with a signal lag parameter and a cyclic frequency parameter (e.g., a generally cyclostationary signal). Method 500 leverages multiples of the cyclic frequency with a correlation procedure to determine correlation coefficients. The correlation coefficients are aggregated and indicate whether a threshold value is met. Method 500 further includes reducing the signal interference responsive to detecting the presence of the signal interference within the received RF signal.

At block 502, method 500 receives a first RF signal. The RF signal may include a portion associated with (e.g., sourced from, generated by) a communication device networked into a system with a receiving communication device. The first RF signal may further include signal non-cyclostationary signal noise (e.g., device noise). The RF signal may include digitally encoded data such as in the form of orthogonal frequency division multiplexing (OFDM) symbol modulation and/or quadrature amplitude modulation that leverages digital symbol modulation.

At block 504, method 500 further generates digital samples corresponding to the first RF signal. For example, a communication device may include RFFE circuitry (e.g., RFFE circuitry). The RFFE circuitry may include automatic gain control (AGC) that forms a closed-loop feedback regulating loop within an amplifier or chain amplifier that maintains a suitable signal amplitude at its output, despite variation of the signal amplitude at the input. The RFFE circuitry includes an analog to digital converter (ADC) that converts the RF signal through digital sampling of the received signal.

At block 506, processing logic determines a first correlation coefficient using the digital samples with a first value and a second value. The first value corresponds to a sign lag parameter and the second value corresponds to a cyclic frequency parameter. In some embodiments, the first value corresponds to a symbol duration associated with the second RF signal. In some embodiments, the second value corresponds to an orthogonal frequency multiplexing (OFDM) symbol modulation rate associated with the second RF signal. In some embodiments, the second value corresponds to a quadrature amplitude modulation (QAM) symbol modulation rate associated with the second RF signal.

In some embodiments, determining the first correlation coefficient may include determining second digital samples by delaying the digital samples using the first value. Determining the first correlation coefficient may further include determining third digital samples by calculating a conjugate signal associated with the digital samples. Determining the first correlation coefficient may further include determining fourth digital samples by combining the second digital samples and the third digital samples. Determining the first correlation coefficient may further include determining the first correlation coefficient by using a Fourier transform with the fourth digital samples and the second value, wherein the second value corresponds to a cyclic frequency of the Fourier transform.

At block 508, processing logic determines a second correlation using the digital samples with the first value and a third value. The third value corresponds to the cycle frequency parameter and is an integer multiple of a fourth value. The second value is an integer multiple of the fourth value. In some embodiments, processing logic determines a third correlation using the digital samples with the first value and a fifth value. The fifth value corresponds to the cycle frequency parameter and is an integer multiple of the second value that is greater than the third value.

In some embodiments, the processing determines a first detection rate indicating a rate of detection of the signal interference using the first correlation coefficient and the second correlation coefficient. The first detection rate is determined based on one or more parameters of the first RF signal. For example, the first detection rate may be determined using at least one of a signal-to-noise ratio (SNR) value or a signal-to-interference ratio (SIR) value associated with the first RF signal. The SNR and SIR may be used as part of a signal interference detection simulation (e.g., see FIGS. 4A-H). The simulation may indicate a rate of successful detection of interference in cases where signal interference is present and a rate of successful detection of the absence of signal interference in cases where signal interference is absent.

In some embodiments, process logic further determines an overall detection time for making a determination whether a received signal include a portion attributed to an interfering device. For example, detection time may include a time between receiving a signal and making a signal interference determination. As discussed in other embodiments, one or more methodologies may include determining a number of correlation coefficients to use for detecting whether a portion of the received signal is attributed to a second RF signal. One factor that may be leveraged in determining how many coefficients to determine is detection time which is variably determine based on the number of correlation coefficients calculated. Processing logic may determine that an aggregate duration of time to calculate the correlation coefficients.

At block 510, processing logic determines a fourth value by combining the first correlation coefficient and the second correlation coefficient. The fourth value may include one or more aspects, details, and/or features used to describe target threshold, γ, as used throughout. In some embodiments, combining the correlation coefficients (e.g., metrics) includes adding each of the values together. In some embodiments, combining the correlation coefficient includes determining statistically significant values associated with the correlation coefficients such as mean, medium, range, standard deviation, one or more percentile values, a maximum value, and so on. In some embodiments, combining the correlation coefficients may be performed using weights. For example, the value may be combined by squares each coefficient and adding them together.

At block 512, processing logic determines, using the first correlation coefficient and the second correlation coefficient, that a first portion for the RF signal is attributed to a second RF signal having a signal lag corresponding to the first value and a cyclic frequency corresponding to the fourth value. The second RF signal may be associated with an interfering communication device (e.g., communication device 120). At block 514, processing logic removes at least a portion of the signal interference from the digital samples. For example, a portion of the RF signal is removed from (e.g., subtracted from) the first RF signal. In some embodiments, processing logic may cause a notification to be displayed (e.g., on a graphical user interface (GUI)). The notification indicates the presence or absence of the interfering signal.

In some embodiments, processing logic may cause one or more alterations to a performance of one or more functions of a communication device responsive to determining that a first portion of the RF signal is attributed to the second RF signal. For example, the processing logic may indicate to downstream processes that an interfering signal is present in the received signal.

In some embodiments, process logic may send a signal to a communication device (e.g., a known device in a communication network such as communication device 110 of FIG. 1). For example, the RF signal may be received in a first wireless channel between the first communication device and a second communication device. The second portion of the first RF signal may be attributed to a third RF signal associated with the second communication device. Processing logic may further send a command to the second communication device responsive to determining that the first portion of the first RF signal is attributed to the second RF signal. Processing logic may further receive a fourth RF signal in a second wireless channel between the first communication device and the second communication device responsive to the command.

Figure 6:
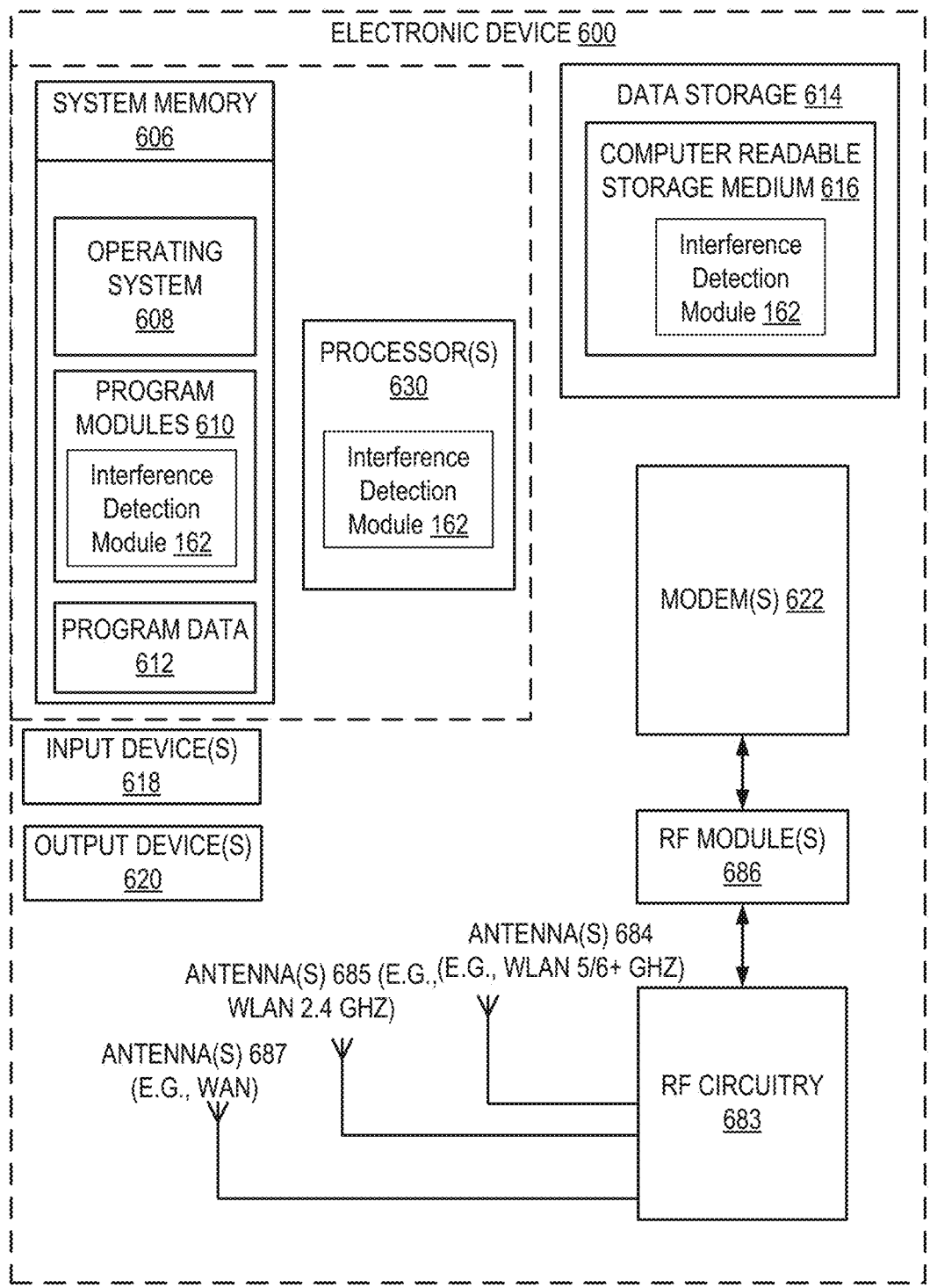
FIG. 6 is a block diagram of an electronic device with an interference detection module, according to one embodiment.

FIG. 6 is a block diagram of an electronic device 600 (e.g., user device) with an interference detection module 162, according to one embodiment. The electronic device 600 may correspond to any of communication devices 110, 120, and 130, as shown in FIG. 1. Alternatively, the electronic device 600 may be other electronic devices, as described herein.

The electronic device 600 includes one or more processor(s) 830, such as one or more CPUs, microcontrollers, field-programmable gate arrays, or other types of processors. The electronic device 600 also includes system memory 606, which may correspond to any combination of volatile and/or non-volatile storage mechanisms. The system memory 606 stores information that provides operating system component 608, various program modules 610, program data 612, and/or other components. The program modules 610 may include instructions of the device interference detection module 162. In one embodiment, the system memory 606 stores instructions of methods to control the operation of the electronic device 600. The electronic device 600 performs functions by using the processor(s) 630 to execute instructions provided by the system memory 606.

The electronic device 600 also includes a data storage device 614 that may be composed of one or more types of removable storage and/or one or more types of non-removable storage. The data storage device 614 includes a computer-readable storage medium 616 on which is stored one or more sets of instructions embodying any of the methodologies or functions described herein. Instructions for the program modules 610 may reside, completely or at least partially, within the computer-readable storage medium 616, system memory 606 and/or within the processor(s) 630 during execution thereof by the electronic device 600, the system memory 606 and the processor(s) 630 also constituting computer-readable media. The electronic device 600 may also include one or more input devices 618 (keyboard, mouse device, specialized selection keys, etc.) and one or more output devices 620 (displays, printers, audio output mechanisms, etc.).

The electronic device 600 further includes a modem 622 to allow the electronic device 600 to communicate via wireless connections (e.g., such as provided by the wireless communication system) with other computing devices, such as remote computers, an item providing system, and so forth. The modem 622 can be connected to one or more RF modules 686. The RF modules 686 may be a WLAN module, a WAN module, a personal area network (PAN) module, a GPS module, or the like. The antenna structures (antenna(s) 684, 685, and 687) are coupled to the RF circuitry 683, which is coupled to the modem 622. The RF circuitry 683 may include radio front-end circuitry, antenna switching circuitry, impedance matching circuitry, or the like. The antennas 684 may be GPS antennas, NFC antennas, other WAN antennas, WLAN or PAN antennas, or the like. The modem 622 allows the electronic device 600 to handle both voice and non-voice communications (such as communications for text messages, multimedia messages, media downloads, web browsing, etc.) with a wireless communication system. The modem 622 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 622 may generate signals and send these signals to antenna(s) 684 of a first type (e.g., WLAN 5/6+ GHz), antenna(s) 685 of a second type (e.g., WLAN 2.4 GHz), and/or antenna(s) 687 of a third type (e.g., WAN), via RF circuitry 683, and RF module(s) 686 as described herein. Antennas 684, 685, and 687 may be configured to transmit in different frequency bands and/or using different wireless communication protocols. The antennas 684, 685, and 687 may be directional, omnidirectional, or non-directional antennas. In addition to sending data, antennas 684, 685, and 687 may also receive data, which is sent to appropriate RF modules connected to the antennas. One of the antennas 684, 685, 687 may be any combination of the antenna structures described herein.

In one embodiment, the electronic device 600 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 622 is shown to control transmission and reception via antenna (684, 685, 687), the electronic device 600 may alternatively include multiple modems, each of which is configured to transmit/receive data via a different antenna and/or wireless transmission protocol.

Figure 7:
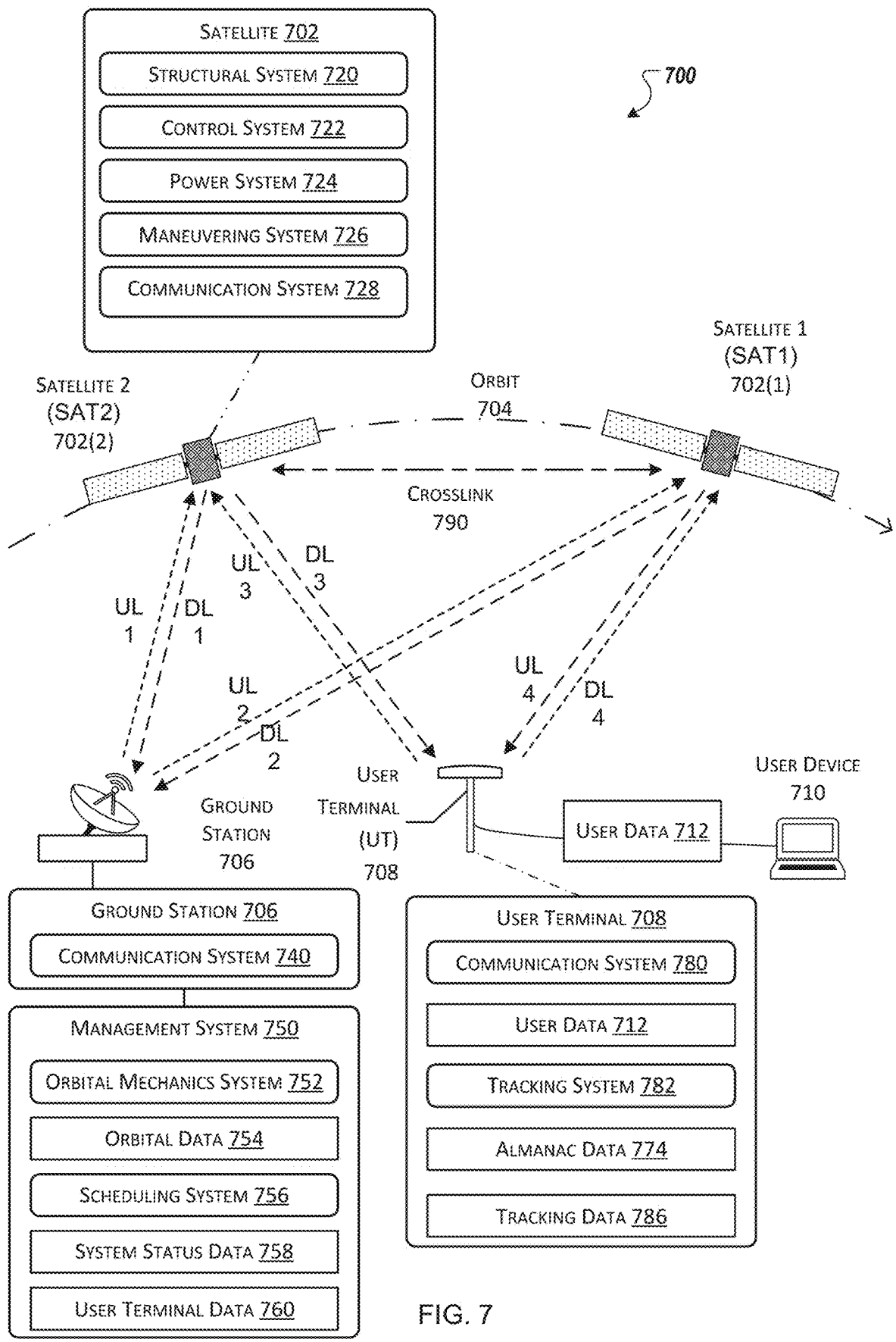
FIG. 7 illustrates a portion of a communication system that includes two satellites of a constellation of satellites, each satellite being in orbit, according to embodiments of the present disclosure.

FIG. 7 illustrates a portion of a communication system 700 that includes two satellites of a constellation of satellites 702(1), 702(2), . . . , 702(S), each satellite 702 being in orbit 704 according to embodiments of the present disclosure. The system 700 shown here comprises a plurality (or "constellation") of satellites 702(1), 702(2), . . . , 702(S), each satellite 702 being in orbit 704. Any of the satellites 702 can include the communication system 100 of FIG. 1, as well as other communication devices described herein. Also shown is a ground station 706, user terminal (UT) 708, and a user device 710.

The constellation may comprise hundreds or thousands of satellites 702, in various orbits 704. For example, one or more of these satellites 702 may be in non-geosynchronous orbits (NGOs) in which they are in constant motion with respect to the Earth. For example, the orbit 704 is a low earth orbit (LEO). In this illustration, orbit 704 is depicted with an arc pointed to the right. A first satellite (SAT1) 1302(1) is leading (ahead of) a second satellite (SAT2) 702(2) in the orbit 704.

The satellite 702 may comprise a structural system 720, a control system 722, a power system 724, a maneuvering system 726, and a communication system 728 described herein. In other implementations, some systems may be omitted or other systems added. One or more of these systems may be communicatively coupled with one another in various combinations.

The structural system 720 comprises one or more structural elements to support operation of the satellite 702. For example, the structural system 720 may include trusses, struts, panels, and so forth. The components of other systems may be affixed to, or housed by, the structural system 720. For example, the structural system 720 may provide mechanical mounting and support for solar panels in the power system 724. The structural system 720 may also provide for thermal control to maintain components of the satellite 702 within operational temperature ranges. For example, the structural system 720 may include louvers, heat sinks, radiators, and so forth.

The control system 722 provides various services, such as operating the onboard systems, resource management, providing telemetry, processing commands, and so forth. For example, the control system 722 may direct operation of the communication system 728.

The power system 724 provides electrical power for operation of the components onboard the satellite 702. The power system 724 may include components to generate electrical energy. For example, the power system 724 may comprise one or more photovoltaic cells, thermoelectric devices, fuel cells, and so forth. The power system 724 may include components to store electrical energy. For example, the power system 724 may comprise one or more batteries, fuel cells, and so forth.

The maneuvering system 726 maintains the satellite 702 in one or more of a specified orientation or orbit 704. For example, the maneuvering system 726 may stabilize the satellite 702 with respect to one or more axis. In another example, the maneuvering system 726 may move the satellite 702 to a specified orbit 704. The maneuvering system 726 may include one or more computing devices, sensors, thrusters, momentum wheels, solar sails, drag devices, and so forth. For example, the sensors of the maneuvering system 726 may include one or more global navigation satellite system (GNSS) receivers, such as global positioning system (GPS) receivers, to provide information about the position and orientation of the satellite 702 relative to Earth. In another example, the sensors of the maneuvering system 726 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 728 provides communication with one or more other devices, such as other satellites 702, ground stations 706, user terminals 708, and so forth. The communication system 728 may include one or more modems, digital signal processors, power amplifiers, antennas (including at least one antenna that implements multiple antenna elements, such as a phased array antenna, and including an embedded calibration antenna, such as the calibration antenna 704 as described herein), processors, memories, storage devices, communications peripherals, interface buses, and so forth. Such components support communications with other satellites 702, ground stations 706, user terminals 708, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 728 may be output to other systems, such as to the control system 722, for further processing. Output from a system, such as the control system 722, may be provided to the communication system 728 for transmission.

One or more ground stations 706 are in communication with one or more satellites 702. The ground stations 706 may pass data between the satellites 702, a management system 750, networks such as the Internet, and so forth. The ground stations 706 may be emplaced on land, on vehicles, at sea, and so forth. Each ground station 706 may comprise a communication system 740. Each ground station 706 may use the communication system 740 to establish communication with one or more satellites 702, other ground stations 706, and so forth. The ground station 706 may also be connected to one or more communication networks. For example, the ground station 706 may connect to a terrestrial fiber optic communication network. The ground station 706 may act as a network gateway, passing user data 712 or other data between the one or more communication networks and the satellites 702. Such data may be processed by the ground station 706 and communicated via the communication system 740. The communication system 740 of a ground station may include components similar to those of the communication system 728 of a satellite 702 and may perform similar communication functionalities. For example, the communication system 740 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 706 are in communication with a management system 750. The management system 750 is also in communication, via the ground stations 706, with the satellites 702 and the UTs 708. The management system 750 coordinates operation of the satellites 702, ground stations 706, UTs 708, and other resources of the system 700. The management system 750 may comprise one or more of an orbital mechanics system 752 or a scheduling system 756. In some embodiments, the scheduling system 756 can operate in conjunction with an HD controller.

The orbital mechanics system 752 determines orbital data 754 that is indicative of a state of a particular satellite 702 at a specified time. In one implementation, the orbital mechanics system 752 may use orbital elements that represent characteristics of the orbit 704 of the satellites 702 in the constellation to determine the orbital data 754 that predicts location, velocity, and so forth of particular satellites 702 at particular times or time intervals. For example, the orbital mechanics system 752 may use data obtained from actual observations from tracking stations, data from the satellites 702, scheduled maneuvers, and so forth to determine the orbital elements. The orbital mechanics system 752 may also consider other data, such as space weather, collision mitigation, orbital elements of known debris, and so forth.

The scheduling system 756 schedules resources to provide communication to the UTs 708. For example, the scheduling system 756 may determine handover data that indicates when communication is to be transferred from the first satellite 702(1) to the second satellite 702(2). Continuing the example, the scheduling system 756 may also specify communication parameters such as frequency, timeslot, and so forth. During operation, the scheduling system 756 may use information such as the orbital data 754, system status data 758, user terminal data 760, and so forth.

The system status data 758 may comprise information such as which UTs 708 are currently transferring data, satellite availability, current satellites 702 in use by respective UTs 708, capacity available at particular ground stations 706, and so forth. For example, the satellite availability may comprise information indicative of satellites 702 that are available to provide communication service or those satellites 702 that are unavailable for communication service. Continuing the example, a satellite 702 may be unavailable due to malfunction, previous tasking, maneuvering, and so forth. The system status data 758 may be indicative of past status, predictions of future status, and so forth. For example, the system status data 758 may include information such as projected data traffic for a specified interval of time based on previous transfers of user data 712. In another example, the system status data 758 may be indicative of future status, such as a satellite 702 being unavailable to provide communication service due to scheduled maneuvering, scheduled maintenance, scheduled decommissioning, and so forth.

The user terminal data 760 may comprise information such a location of a particular UT 708. The user terminal data 760 may also include other information such as a priority assigned to user data 712 associated with that UT 708, information about the communication capabilities of that particular UT 708, and so forth. For example, a particular UT 708 in use by a business may be assigned a higher priority relative to a UT 708 operated in a residential setting.

Over time, different versions of UTs 708 may be deployed, having different communication capabilities such as being able to operate at particular frequencies, supporting different signal encoding schemes, having different antenna configurations, and so forth.

The UT 708 includes a communication system 780 to establish communication with one or more satellites 702. The communication system 780 of the UT 708 may include components similar to those of the communication system 728 of a satellite 702 and may perform similar communication functionalities. For example, the communication system 780 may include one or more modems, digital signal processors, power amplifiers, antennas (including at least one antenna that implements multiple antenna elements, such as a phased array antenna), processors, memories, storage devices, communications peripherals, interface buses, and so forth. The UT 708 passes user data 712 between the constellation of satellites 702 and the user device 710. The user data 712 includes data originated by the user device 710 or addressed to the user device 710. The UT 708 may be fixed or in motion. For example, the UT 708 may be used at a residence, or on a vehicle such as a car, boat, aerostat, drone, airplane, and so forth.

The UT 708 includes a tracking system 782. The tracking system 782 uses almanac data 784 to determine tracking data 786. The almanac data 784 provides information indicative of orbital elements of the orbit 704 of one or more satellites 702. For example, the almanac data 784 may comprise orbital elements such as "two-line element" data for the satellites 702 in the constellation that are broadcast or otherwise sent to the UTs 708 using the communication system 780.

The tracking system 782 may use the current location of the UT 708 and the almanac data 784 to determine the tracking data 786 for the satellite 702. For example, based on the current location of the UT 708 and the predicted position and movement of the satellites 702, the tracking system 782 is able to calculate the tracking data 786. The tracking data 786 may include information indicative of azimuth, elevation, distance to the second satellite, time of flight correction, or other information at a specified time. The determination of the tracking data 786 may be ongoing. For example, the first UT 708 may determine tracking data 786 every ten ms, every second, every five seconds, or at other intervals.

With regard to FIG. 7, an uplink is a communication link which allows data to be sent to a satellite 702 from a ground station 706, UT 708, or device other than another satellite 702. Uplinks are designated as UL1, UL2, UL3 and so forth. For example, UL1 is a first uplink from the ground station 706 to the second satellite 702(2). In comparison, a downlink is a communication link which allows data to be sent from the satellite 702 to a ground station 706, UT 708, or device other than another satellite 702. For example, DL1 is a first downlink from the second satellite 702(2) to the ground station 706. The satellites 702 may also be in communication with one another. For example, a crosslink 790 provides for communication between satellites 702 in the constellation.

The satellite 702, the ground station 706, the user terminal 708, the user device 710, the management system 750, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 8:
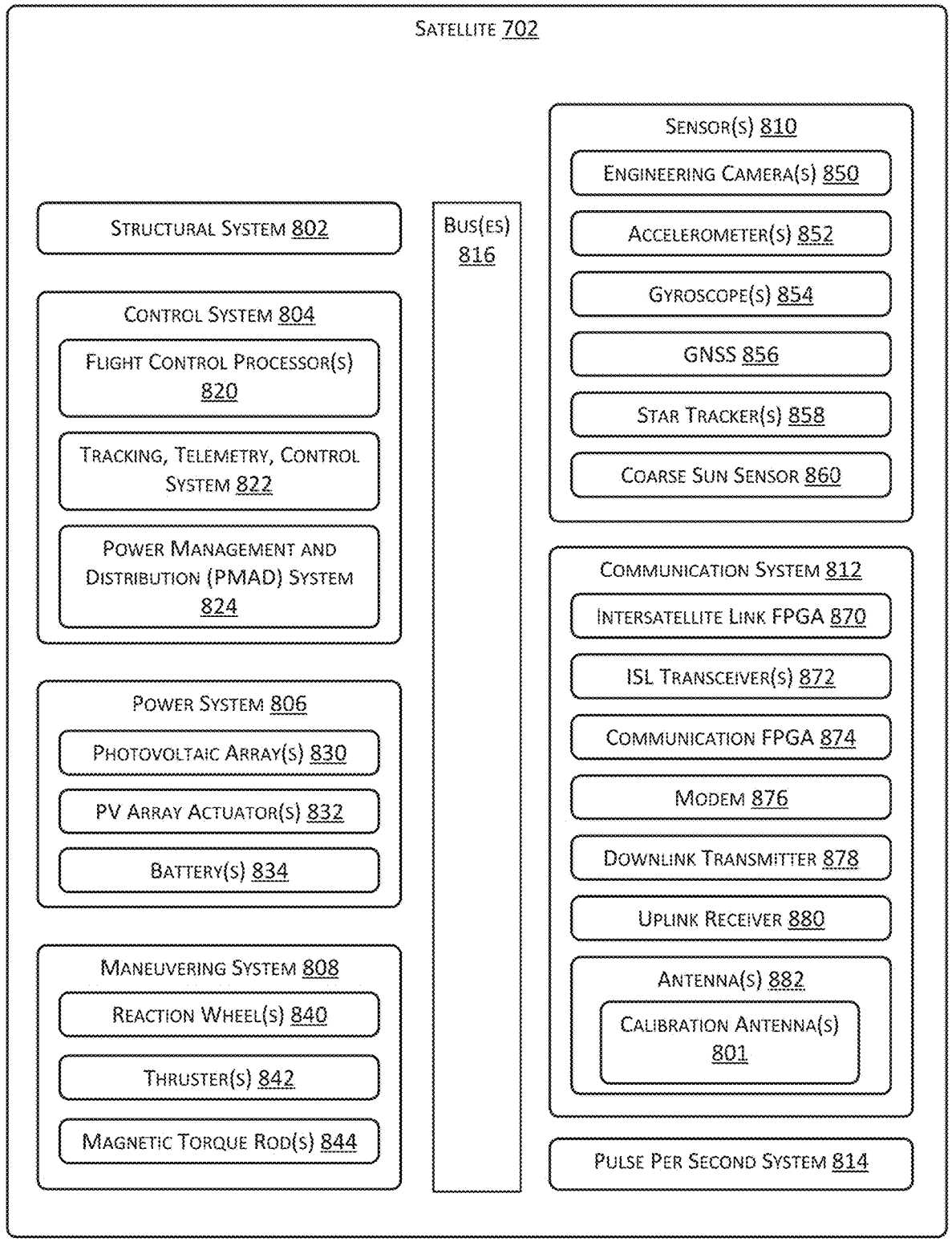
FIG. 8 is a functional block diagram of some systems associated with the satellite, according to some implementations.

FIG. 8 is a functional block diagram of some systems associated with the satellite 702, according to some implementations. The satellite 702 may comprise a structural system 802, a control system 804, a power system 806, a maneuvering system 808, one or more sensors 810, and a communication system 812. A pulse per second (PPS) system 814 may be used to provide timing reference to the systems onboard the satellite 702. One or more busses 816 may be used to transfer data between the systems onboard the satellite 702. In some implementations, redundant busses 816 may be provided. The busses 816 may include, but are not limited to, data busses such as Controller Area Network Flexible Data Rate (CAN FD), Ethernet, Serial Peripheral Interface (SPI), and so forth. In some implementations the busses 816 may carry other signals. For example, a radio frequency bus may comprise coaxial cable, waveguides, and so forth to transfer radio signals from one part of the satellite 702 to another. In other implementations, some systems may be omitted or other systems added. One or more of these systems may be communicatively coupled with one another in various combinations.

The structural system 802 comprises one or more structural elements to support operation of the satellite 702. For example, the structural system 802 may include trusses, struts, panels, and so forth. The components of other systems may be affixed to, or housed by, the structural system 802. For example, the structural system 802 may provide mechanical mounting and support for solar panels in the power system 806. The structural system 802 may also provide for thermal control to maintain components of the satellite 702 within operational temperature ranges. For example, the structural system 802 may include louvers, heat sinks, radiators, and so forth.

The control system 804 provides various services, such as operating the onboard systems, resource management, providing telemetry, processing commands, and so forth. For example, the control system 804 may direct operation of the communication system 812. The control system 804 may include one or more flight control processors 820. The flight control processors 820 may comprise one or more processors, FPGAs, and so forth. A tracking, telemetry, and control (TTC) system 822 may include one or more processors, radios, and so forth. For example, the TTC system 822 may comprise a dedicated radio transmitter and receiver to receive commands from a ground station 706, send telemetry to the ground station 706, and so forth. A power management and distribution (PMAD) system 824 may direct operation of the power system 806, control distribution of power to the systems of the satellite 702, control battery 834 charging, and so forth.

The power system 806 provides electrical power for operation of the components onboard the satellite 702. The power system 806 may include components to generate electrical energy. For example, the power system 806 may comprise one or more photovoltaic arrays 830 comprising a plurality of photovoltaic cells, thermoelectric devices, fuel cells, and so forth. One or more PV array actuators 832 may be used to change the orientation of the photovoltaic array(s) 830 relative to the satellite 702. For example, the PV array actuator 832 may comprise a motor. The power system 806 may include components to store electrical energy. For example, the power system 806 may comprise one or more batteries 834, fuel cells, and so forth.

The maneuvering system 808 maintains the satellite 702 in one or more of a specified orientation or orbit 704. For example, the maneuvering system 808 may stabilize the satellite 702 with respect to one or more axes. In another example, the maneuvering system 808 may move the satellite 702 to a specified orbit 704. The maneuvering system 808 may include one or more of reaction wheel(s) 840, thrusters 842, magnetic torque rods 844, solar sails, drag devices, and so forth. The thrusters 842 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 806 to expel the water and produce thrust. During operation, the maneuvering system 808 may use data obtained from one or more of the sensors 810.

The satellite 702 includes one or more sensors 810. The sensors 810 may include one or more engineering cameras 850. For example, an engineering camera 850 may be mounted on the satellite 702 to provide images of at least a portion of the photovoltaic array 830. Accelerometers 852 provide information about acceleration of the satellite 702 along one or more axes. Gyroscopes 854 provide information about rotation of the satellite 702 with respect to one or more axes. The sensors 810 may include a global navigation satellite system (GNSS) 856 receiver, such as Global Positioning System (GPS) receiver, to provide information about the position of the satellite 702 relative to Earth. In some implementations the GNSS 856 may also provide information indicative of velocity, orientation, and so forth. One or more star trackers 858 may be used to determine an orientation of the satellite 702. A coarse sun sensor 860 may be used to detect the sun, provide information on the relative position of the sun with respect to the satellite 702, and so forth. The satellite 702 may include other sensors 810 as well. For example, the satellite 702 may include a horizon detector, radar, lidar, and so forth.

The communication system 812 provides communication with one or more other devices, such as other satellites 702, ground stations 706, user terminals 708, and so forth. The communication system 812 may include one or more modems 876, digital signal processors, power amplifiers, antennas 882, processors, memories, storage devices, communications peripherals, interface buses, and so forth. Such components support communications with other satellites 802, ground stations 806 user terminals 808, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 812 may be output to other systems, such as to the control system 804, for further processing. Output from a system, such as the control system 804, may be provided to the communication system 812 for transmission.

The communication system 812 may include hardware to support the intersatellite link 890. For example, an intersatellite link FPGA 870 may be used to modulate data that is sent and received by an ISL transceiver 872 to send data between satellites 802. The ISL transceiver 872 may operate using radio frequencies, optical frequencies, and so forth.

A communication FPGA 874 may be used to facilitate communication between the satellite 702 and the ground stations 706, UTs 708, and so forth. For example, the communication FPGA 874 may direct operation of a modem 876 to modulate signals sent using a downlink transmitter 878 and demodulate signals received using an uplink receiver 880. The satellite 702 may include one or more antennas 882. For example, one or more parabolic antennas may be used to provide communication between the satellite 702 and one or more ground stations 706. In another example, a phased array antenna may be used to provide communication between the satellite 702 and the UTs 708.

Figure 9:
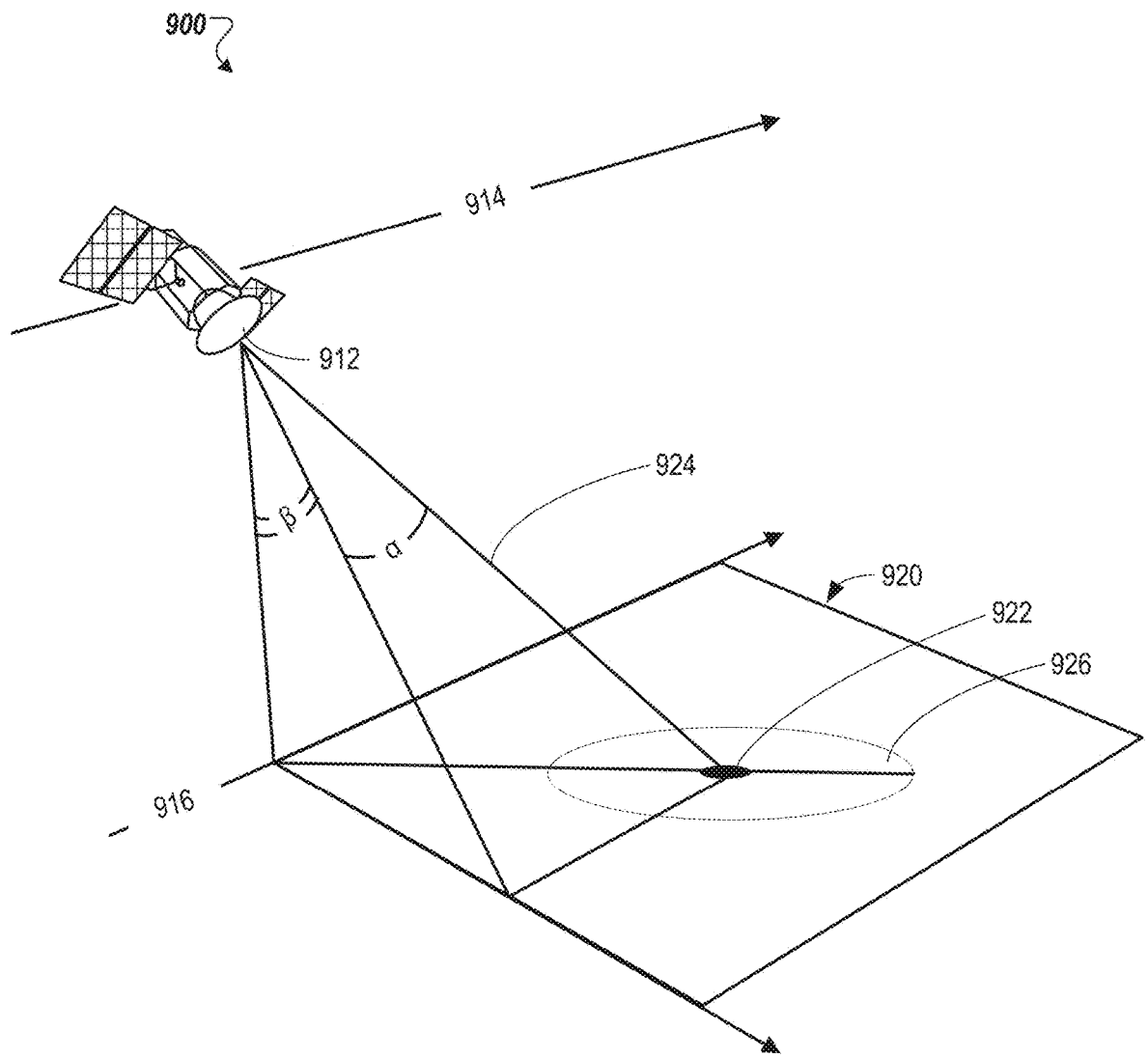
FIG. 9 illustrates a satellite including an antenna system that is steerable, according to embodiments of the present disclosure.

FIG. 9 illustrates the satellite 900 including an antenna system 912 that is steerable according to embodiments of the present disclosure. The satellite 900 can include can include the communication system 100 of FIG. 1, as well as other communication devices described herein. The antenna system 912 may include multiple antenna elements that form an antenna and that can be mechanically or electrically steered individually, collectively, or a combination thereof. In an example, the antenna is a phased array antenna.

In orbit 704, the satellite 900 follows a path 914, the projection of which onto the surface of the Earth forms a ground path 916. In the example illustrated in FIG. 9, the ground path 916 and a projected axis extending orthogonally from the ground path 916 at the position of the satellite 900, together define a region 920 of the surface of the Earth. In this example, the satellite 900 is capable of establishing uplink and downlink communications with one or more of ground stations, user terminals, or other devices within the region 920. In some embodiments, the region 920 may be located in a different relative position to the ground path 916 and the position of the satellite 900. For example, the region 920 may describe a region of the surface of the Earth directly below the satellite 900. Furthermore, embodiments may include communications between the satellite 900, an airborne communications system, and so forth.

As shown in FIG. 9, a communication target 922 (e.g., a ground station, a user terminal, or a CT (such as an HD CT)) is located within the region 920. The satellite 900 controls the antenna system 912 to steer transmission and reception of communications signals to selectively communicate with the communication target 922. For example, in a downlink transmission from the satellite 900 to the communication target 922, a signal beam 924 emitted by the antenna system 912 is steerable within an area 926 of the region 920. In some implementations, the signal beam 924 may include multiple subbeams. The extents of the area 926 define an angular range within which the signal beam 924 is steerable, where the direction of the signal beam 924 is described by a beam angle "$\alpha$" relative to a surface normal vector of the antenna system 912. In two-dimensional phased array antennas, the signal beam 924 is steerable in two dimensions, described in FIG. 9 by a second angle "$\beta$" orthogonal to the beam angle $\alpha$. In this way, the area 926 is a two-dimensional area within the region 920, rather than a linear track at a fixed angle determined by the orientation of the antenna system 912 relative to the ground path 916.

In FIG. 9, as the satellite 900 follows the path 914, the area 926 tracks along the surface of the Earth. In this way, the communication target 922, which is shown centered in the area 926 for clarity, is within the angular range of the antenna system 912 for a period of time. During that time, signals communicated between the satellite 900 and the communication target 922 are subject to bandwidth constraints, including but not limited to signal strength and calibration of the signal beam 924. In an example, for phased array antenna systems, the signal beam 924 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 10:
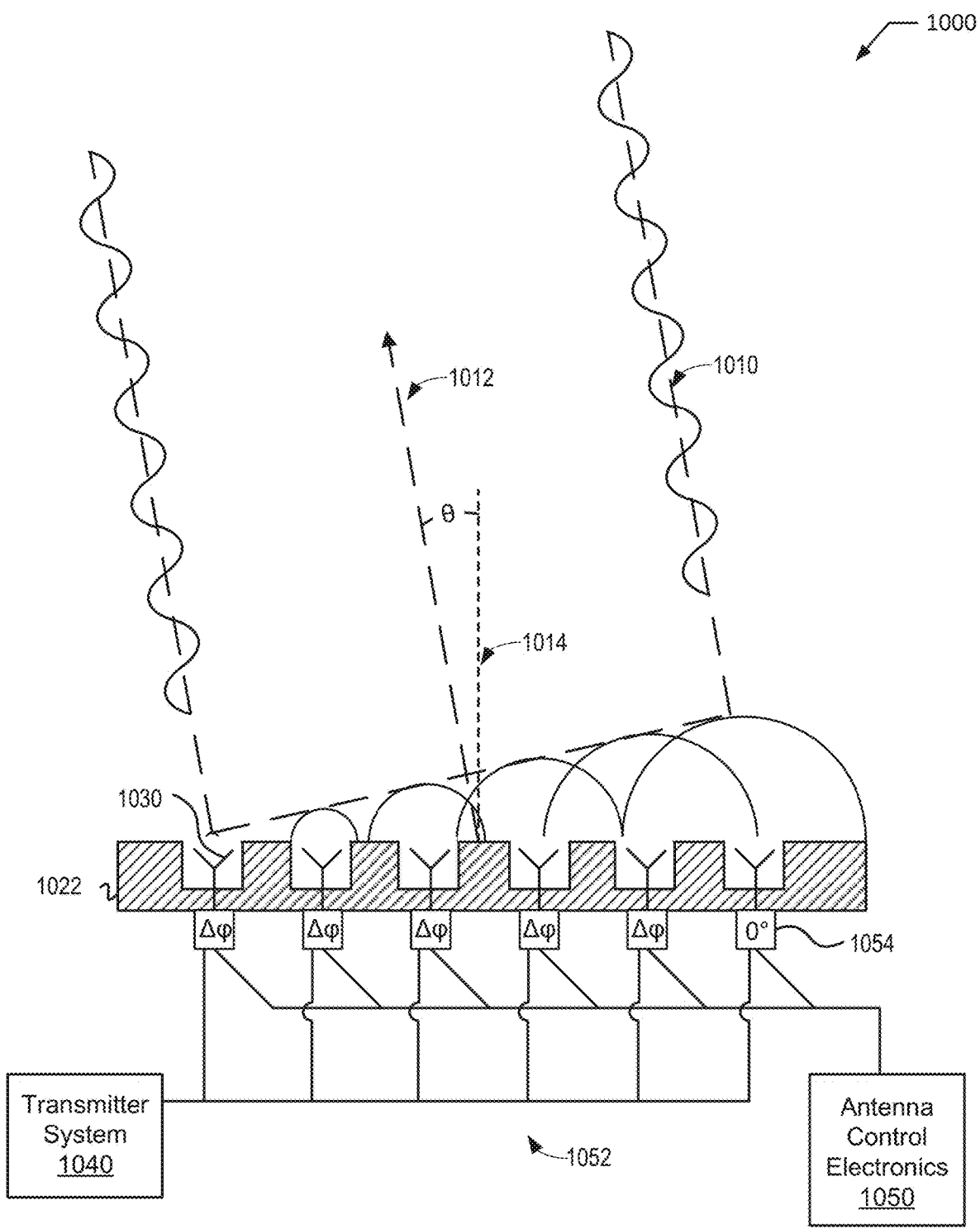
FIG. 10 illustrates a simplified schematic of an antenna, according to embodiments of the present disclosure.

FIG. 10 illustrates a simplified schematic of an antenna 1000, according to embodiments of the present disclosure. The antenna 1000 may be a component of the antenna system 912 of FIG. 9. As illustrated, the antenna 1000 is a phased array antenna that includes multiple antenna elements 1003. Interference between the antenna elements 1030 forms a directional radiation pattern in both transmitter and receiver arrays forming a beam 1010 (beam extents shown as dashed lines). The beam 1010 is a portion of a larger transmission pattern (not shown) that extends beyond the immediate vicinity of the antenna 1000. The beam 1010 is directed along a beam vector 1012, described by an angle "$\theta$" relative to an axis 1014 normal to a surface of the antenna 1000. As described below, the beam 1010 is one or more of steerable or shapeable through control of operating parameters including, but not limited to a phase and an amplitude of each antenna element 1030.

In FIG. 10, the antenna 1000 includes, within a transmitter section 1022, the antenna elements 1030, which may include, but are not limited to, omnidirectional transmitter antennas coupled to a transmitter system 1040, such as the downlink transmitter 878. The transmitter system 1040 provides a signal, such as a downlink signal to be transmitted to a ground station on the surface. The downlink signal is provided to each antenna element 1030 as a time-varying signal that may include several multiplexed signals. To steer the beam 1010 relative to the axis 1014, the phased array antenna system 1000 includes antenna control electronics 1050 controlling a radio frequency (RF) feeding network 1052, including multiple signal conditioning components 1054 interposed between the antenna elements 1030 and the transmitter system 1040. The signal conditioning components 1054 introduce one or more of a phase modulation or an amplitude modulation, as denoted by "Δφ" in FIG. 10, to the signal sent to the antenna elements 1030. As shown in FIG. 10, introducing a progressive phase modulation produces interference in the individual transmission of each antenna element 1030 that generates the beam 1010.

The phase modulation imposed on each antenna element 1030 can differ and can be dependent on a spatial location of a communication target that determines an optimum beam vector (e.g., where the beam vector 1012 is found by one or more of maximizing signal intensity or connection strength). The optimum beam vector may change with time as the communication target 922 moves relative to the phased array antenna system 1000.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method, comprising:
   receiving a first radio frequency (RF) signal;
   generating digital samples corresponding to the first RF signal;
   determining a first correlation coefficient using a first copy of the digital samples with a first cyclic autocorrelation (CAC) function comprising a first value and a second value, wherein the first value indicates a signal delay of the first CAC function and the second value indicates a first cyclic frequency of the first CAC function, wherein the first correlation coefficient represents first peak values for a first number of cyclic peaks given the signal delay and the first cyclic frequency;
   determining a second correlation coefficient using a second copy of the digital samples with a second CAC function comprising the first value and a third value corresponding to a second cyclic frequency of the second CAC function, wherein the second cyclic frequency is an integer multiple of the first cyclic frequency, wherein the second correlation coefficient represents second peak values for a second number of cyclic peaks given the signal delay and the second cyclic frequency;
   determining a total correlation coefficient by combining the first correlation coefficient and the second correlation coefficient, wherein the total correlation coefficient represents a sum of the first peak values and the second peak values; and
   responsive to determining that the total correlation coefficient meets a threshold value, determining that a portion of the first RF signal is attributed to a second RF signal.

2. The method of claim 1, further comprising:
   determining a third correlation coefficient using a third copy of the digital samples with a third CAC function, the third CAC function comprising the first value and a fourth value corresponding to a third cyclic frequency of the third CAC function, wherein the third cyclic frequency is an integer multiple of the first cyclic frequency, and wherein the total correlation coefficient further includes the third correlation coefficient.

3. A method comprising, by a first communication device:
receiving a first radio frequency (RF) signal;
generating digital samples corresponding to the first RF signal;
determining a first correlation coefficient using the digital samples, a first value, and a second value, wherein the first value corresponds to a signal lag parameter and the second value corresponds to a first cyclic frequency parameter;
determining a second correlation coefficient using the digital samples, the first value, and a third value, wherein the third value corresponds to a second cyclic frequency parameter that is an integer multiple of the first cyclic frequency parameter;
determining a total correlation coefficient by summing the first correlation coefficient and the second correlation coefficient; and
determining, using the total correlation coefficient, that the first RF signal comprises a first portion from a second communication device and a second portion from a third communication device, wherein the second portion has a signal lag corresponding to the first value and a cyclic frequency corresponding to the second value.

4. The method of claim 3, wherein prior to determining that the first RF signal comprises the first portion and the second portion, the method further comprising:
determining a third correlation coefficient using the digital samples, the first value, and a fourth value, wherein the fourth value corresponds to a third cyclic frequency parameter that is an integer multiple of the first cyclic frequency parameter, wherein:
determining the total correlation coefficient comprises determining the total correlation coefficient in view of the first correlation coefficient, the second correlation coefficient, and the third correlation coefficient; and
determining that the first RF signal comprises the first portion and the second portion comprise determining that the total correlation coefficient meets a threshold value.

5. The method of claim 4, wherein further comprising determining a maximum value between at least the first correlation coefficient, the second correlation coefficient, and the third correlation coefficient.

6. The method of claim 3, further comprising:
removing at least a selection of the second portion from the first RF signal.

7. The method of claim 3, wherein the first RF signal is received in a first wireless channel between the first communication device and the second communication device:
responsive to determining that the first RF signal comprises the first portion and the second portion, sending a command to the second communication device; and
receiving a second RF signal in a second wireless channel between the first communication device and the second communication device responsive to the command.

8. The method of claim 3, wherein determining the first correlation coefficient comprises:
determining second digital samples by delaying the digital samples using the first value;
determining third digital samples by calculating a conjugate signal associated with the digital samples;
determining fourth digital samples by combining the second digital samples and the third digital samples; and
determining the first correlation coefficient by using a Fourier transform with the fourth digital samples and the second value, wherein the second value further corresponds to a cyclic frequency of the Fourier transform.

9. The method of claim 3, wherein the first value corresponds to a symbol duration associated with the second portion of the first RF signal.

10. The method of claim 3, where the second value corresponds to an orthogonal frequency-division multiplexing (OFDM) symbol modulation rate or a quadrature amplitude modulation (QAM) symbol modulation rate associated with the second portion of the first RF signal.

11. A first communication device, comprising:
radio frequency front-end (RFFE) circuitry comprising an analog-to-digital converter (ADC) to generate digital samples corresponding to a first RF signal received by the RFFE circuitry; and
a processing device coupled to the RFFE circuitry, wherein the processing device:
determines a first metric by performing a correlation procedure using a first copy of the digital samples, a first value, and a second value, wherein the first value corresponds to a signal lag parameter of the correlation procedure and the second value corresponds to a first cyclical frequency parameter of the correlation procedure;
determines a second metric by performing the correlation procedure using a second copy of the digital samples, the first value, and a third value, wherein the third value corresponds to a second cyclical frequency parameter that is an integer multiple of the first cyclical frequency parameter;
determines a combined metric by summing the first metric and the second metric; and
determines, using the first metric and the second metric, that the first RF signal comprises a first portion from a second communication device and a second portion from a third communication device, wherein the second portion has a signal lag corresponding to the first value and a cyclic frequency corresponding to the second value.

12. The first communication device of claim 11, wherein prior to determining that the first RF signal comprises the first portion and the second portion, the processing device further:
determines a third metric by performing the correlation procedure using a third copy of the digital samples, the first value, and a fourth value, wherein the fourth value corresponds to a third cyclical frequency parameter that is an integer multiple of the first cyclic frequency parameter;
determines the combined metric in view of the first metric, the second metric, and the third metric; and
determines that the combined metric meets a threshold value.

13. The first communication device of claim 11, wherein the processing device further:
removes at least a selection of the second portion from the first RF signal.

14. The first communication device of claim 11, wherein the first RF signal is received in a first wireless channel between the first communication device and the second communication device, wherein the processing device further:

responsive to determining that the first RF signal comprises the first portion and the second portion, sends a command to the second communication device; and receives a second RF signal in a second wireless channel between the first communication device and the second communication device responsive to the command.

15. The first communication device of claim 11, wherein the processing device further:

determines second digital samples by delaying the digital samples using the first value;

determines third digital samples by calculating a conjugate signal associated with the digital samples;

determines fourth digital samples by combining the second digital samples and the third digital samples; and determines the first metric using a Fourier transform with the fourth digital samples and the second value, wherein the second value further corresponds to a cyclic frequency of the Fourier transform.

16. The first communication device of claim 11, wherein the first value corresponds to a symbol duration associated with the second portion of the first RF signal.

17. The first communication device of claim 11, wherein the second value corresponds to one of an orthogonal frequency-division multiplexing (OFDM) symbol modulation rate or a quadrature amplitude modulation (QAM) symbol modulation rate associated with the second portion of the first RF signal.

18. The first communication device of claim 11, wherein the first communication device comprises an artificial satellite.

* * * * *